United States Patent
Gummadi et al.

(10) Patent No.: US 12,414,073 B2
(45) Date of Patent: Sep. 9, 2025

(54) POSITIONING OF AN INTELLIGENT REFLECTING SURFACE (IRS) IN A WIRELESS COMMUNICATION NETWORK

(71) Applicant: QUALCOMM Incorporated, San Diego, CA (US)

(72) Inventors: Bapineedu Chowdary Gummadi, Hyderabad (IN); Stephen William Edge, Escondido, CA (US); Binil Francis Joseph, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 17/664,120

(22) Filed: May 19, 2022

(65) Prior Publication Data

US 2023/0379867 A1 Nov. 23, 2023

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0051* (2013.01); *H04W 24/10* (2013.01); *H04W 56/009* (2013.01)

(58) Field of Classification Search
CPC ............ H04B 7/04013; H04W 64/003; H04W 56/009; H04W 24/10; H04W 88/18; G01S 7/006; G01S 13/06; H04L 5/0051
See application file for complete search history.

(56) References Cited

U.S. PATENT DOCUMENTS 11,528,657 B1 * 12/2022 Mangalvedhe .... H04B 7/04013
2020/0296680 A1 * 9/2020 Akkarakaran ........ H04W 4/029
(Continued)

FOREIGN PATENT DOCUMENTS

CN 113993180 A 1/2022
EP 2773156 A1 9/2014

OTHER PUBLICATIONS

Ibrahim Emad., et al., "On the Position of Intelligent Reflecting Surfaces", 2021 Joint European Conference on Networks and Communications & 6G Summit (Eucnc/6g Summit), IEEE, Jun. 8, 2021, pp. 66-71, XP033946018, Sections I to V, figures 1,2.
(Continued)

*Primary Examiner* — Shukri Taha
(74) *Attorney, Agent, or Firm* — QUALCOMM Incorporated

(57) ABSTRACT

According to embodiments, an example method for positioning an intelligent reflecting surface (IRS) using a transmitting device in a wireless communications network may comprise configuring the IRS to reflect a wireless reference signal back to the transmitting device and subsequent to configuring the IRS, transmitting the wireless reference signal from the transmitting device to the IRS. The method may also comprise receiving a wireless reflected signal at the transmitting device, wherein the wireless reflected signal comprises a reflection of the wireless reference signal, reflected by the IRS and determining measurements configured for positioning the IRS based at least in part on the wireless reflected signal, wherein a location of the IRS is determined based on the measurements.

18 Claims, 15 Drawing Sheets

(51) Int. Cl.
*H04W 24/10* (2009.01)
*H04W 56/00* (2009.01)

(56) References Cited

U.S. PATENT DOCUMENTS

| | | | | |
|---|---|---|---|---|
| 2023/0176174 A1* | 6/2023 | Penna | ............... | G01S 5/02521 |
| | | | | 342/451 |
| 2023/0189021 A1* | 6/2023 | Ali | ............... | H04W 72/0446 |
| | | | | 370/252 |
| 2023/0246674 A1* | 8/2023 | Åström | ............... | H04B 7/145 |
| | | | | 375/262 |
| 2023/0318177 A1* | 10/2023 | Zhou | ............... | H04B 7/04013 |
| | | | | 455/456.1 |
| 2023/0319507 A1* | 10/2023 | Gummadi | ............ | G01S 5/0218 |
| | | | | 455/456.1 |

OTHER PUBLICATIONS

International Search Report and Written Opinion—PCT/US2023/019144—ISA/EPO—Jul. 17, 2023.
Tian Yuguang., et al., "Joint Placement Design and Beamforming in Intelligent Reflecting Surface Assisted Wireless Network", 2021 IEEE 4th International Conference on Electronic Information and Communication Technology (ICEICT), Aug. 18, 2021, pp. 14-19, XP033971991, Sections I-V.

* cited by examiner

POSITIONING OF AN INTELLIGENT REFLECTING SURFACE (IRS) IN A WIRELESS COMMUNICATION NETWORK

BACKGROUND

The present disclosure relates generally to the field of wireless communications, and more specifically to intelligent reflecting surface (IRS) in a wireless communications network.

2. Description of Related Art

In a wireless communication network, positioning of a receiving device (e.g., a user equipment) can involve measurements of a radio frequency (RF) signal (e.g., a wireless reference signal) received by the receiving device. When blockages happen, an IRS may be used for transmitting the RF signal from one or more base stations of the wireless communication network to one or more receiving devices (e.g., redirect the reference signal from the base station to the receiving device). Accordingly, knowing the location of the IRS is crucial when positioning the receiving device based on the RF signal transmitted through the IRS.

BRIEF SUMMARY

Embodiments described herein provide for the determination of the location of an IRS in a wireless communication system. More specifically, the IRS may be configured (e.g., through the IRS controller) by a transmitting device to reflect a wireless reference signal transmitted from the transmitting device back to the transmitting device. Subsequently, the wireless reference signal may be transmitted to the IRS and a wireless reflected signal comprising a reflection of the wireless reference signal (e.g., reflected by the IRS) may be received by the transmitting device accordingly. Measurements such as round trip signal propagation delay (RTT), angle of arrival (AoA), etc., may be determined based at least in part on the wireless reflected signal, and a location of the IRS may thus be determined based on the determined measurements.

An example method of positioning an intelligent reflecting surface (IRS) using a transmitting device in a wireless communications network comprises configuring the IRS to reflect a wireless reference signal back to the transmitting device and subsequent to configuring the IRS, transmitting the wireless reference signal from the transmitting device to the IRS. The method also comprises receiving a wireless reflected signal at the transmitting device, wherein the wireless reflected signal comprises a reflection of the wireless reference signal, reflected by the IRS and determining measurements configured for positioning the IRS based at least in part on the wireless reflected signal, wherein a location of the IRS is determined based on the measurements.

An example method of positioning an intelligent reflecting surface (IRS) using a location server in a wireless communications network comprises transmitting to a transmitting device, a request configuring the transmitting device to transmit a wireless reference signal to the IRS and receiving from the transmitting device, measurements determined based on a wireless reflected signal, wherein the wireless reflected signal comprises a reflection of the wireless reference signal, reflected by the IRS. The method also comprises determining a location of the IRS based on the measurements.

An example transmitting device in a wireless communication network comprises a wireless communication interface configured to configure the IRS to reflect a wireless reference signal back to the transmitting device, subsequent to configuring the IRS, transmit the wireless reference signal to the IRS, and receive a wireless reflected signal, wherein the wireless reflected signal comprises a reflection of the wireless reference signal, reflected by the IRS. The transmitting device also comprises a memory and one or more processing units communicatively coupled to the wireless communication interface and the memory configured to determine measurements configured for positioning the IRS based at least in part on the wireless reflected signal, wherein a location of the IRS is determined based on the measurements An example location server comprises a transceiver configured to transmit to a transmitting device, a request configuring the transmitting device to transmit a wireless reference signal to the IRS and receive from the transmitting device, measurements determined based on a wireless reflected signal, wherein the wireless reflected signal comprises a reflection of the wireless reference signal, reflected by the IRS. The location server also comprises a memory and one or more processing units communicatively coupled to the wireless communication interface and the memory, configured to determine measurements configured for positioning the IRS based at least in part on the wireless reflected signal, wherein a location of the IRS is determined based on the measurements.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
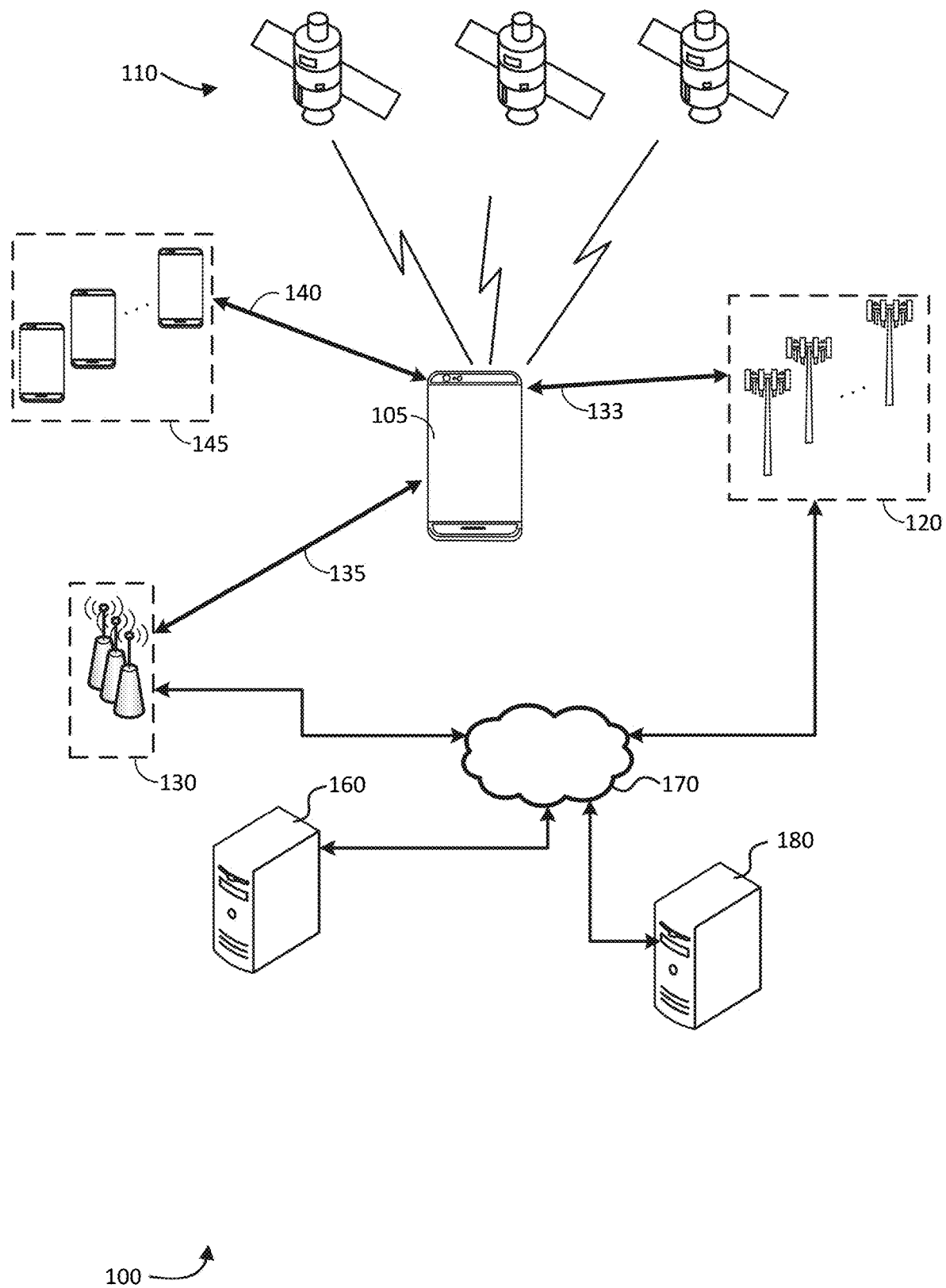
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

In a wireless communication network, positioning of a UE can involve measurements of a RF signal (e.g., a reference signal) determined by a receiving device. In some embodiments, IRSs may be configured as a means to enable propagation paths for RF signals around blockages. With the presence of IRSs, the coverage of the base station (e.g., the wireless network of the base station) can be extended to otherwise unreachable areas. However, compared with directly transmitting the RF signal, when an IRS is being used for transmitting the RF signal (e.g., a transmission path between the transceiver and the receiver is via an IRS) the propagation delay for transmitting the RF signal increases. As a result, knowing a location of the IRS is important for positioning methods that are based on measurements generated using the transmitted positioning reference signals (PRSs), such as Time Difference Of Arrival (TDOA), angle of arrival (AoA), angle of departure (AoD), Reference Signal Time Difference (RSTD), round trip signal propagation delay (RTT), multi-cell RTT, etc.

Described herein are systems, devices, methods, media and other implementations for IRS positioning in a wireless communication system. In some embodiments, the IRS may be positioned based on a wireless reflected signal that includes a reflection (e.g., a 180-degree reflection) of a wireless signal transmitted to the IRS. Specifically, in some embodiments, a transmitting device (e.g., a user equipment (UE) with a known location and/or a base station) may receive a request from a location sever, configuring the transmitting device to configure the IRS (e.g., through the IRS controller) to reflect a wireless reference signal back to the same transmitting device (e.g., configuring the IRS to cause a 180-degree reflection of the wireless reference signal received by the IRS). Subsequently, the transmitting device may configure the IRS to reflect a wireless reference signal back to the transmitting device according to the request and may transmit the wireless reference signal to the IRS. The transmitting device may receive a wireless reflected signal including the reflection (e.g., reflected by the IRS) of the wireless reference signal. The transmitting device may then determine measurements such as RTT, AoA, AoD, etc., based at least in part on the wireless reflected signal. The transmitting device may further transmit the determined measurements to the location server where the location of the IRS may be determined based on the measurements accordingly.

In some other embodiments, when the transmitting device includes a UE with a known location, the transmitting device may generate a request for positioning the IRS and may configure the IRS (e.g., through the IRS controller) to reflect a wireless reference signal back to the transmitting device (e.g., configuring the IRS to cause a 180-degree reflection of the wireless reference signal received by the IRS) instead of receiving the request from the location server. Also, after determining the measurements such as RTT, AoA, AoD, etc., based at least in part on the wireless reflected signal, the transmitting device may determine the location of the IRS based on the measurements by itself. In some embodiments, the determined location of the IRS may be transmitted to the location server for further use.

Additional details will follow after an initial description of relevant systems and technologies.

FIG. 1 is a simplified illustration of a positioning system 100 in which a UE 105, location server 160, and/or other components of the positioning system 100 can use the techniques provided herein for user equipment (UE) positioning in the presence of an intelligent reflecting surface (IRS), according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, network 170 may comprise any of a variety of wireless and/or wireline networks. Network 170 can, for example, comprise any combination of public and/or private networks, local and/or wide-area networks, and the like. Furthermore, network 170 may utilize one or more wired and/or wireless communication technologies. In some embodiments, network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

Base stations 120 and access points (APs) 130 may be communicatively coupled to network 170. In some embodiments, base station 120s may be owned, maintained, and/or operated by a cellular network provider, and may employ any of a variety of wireless technologies, as described herein below. Depending on the technology of network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing network 170 via a base station 120 using a first communication link 133. Additionally or alternatively, because APs 130 also may be communicatively coupled with network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g., with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by UE 105. In particular, these measurements can provide information regarding the relative distance and/or angle of UE 105 from one or more components in positioning system 100 (e.g., GNSS satellites 110, APs 130, base stations 120). The estimated location of UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of UE 105 may be estimated at least in part based on measurements of RF signals 140 communicated between UE 105 and one or more other UEs 145, which may be mobile or fixed. When one or more other UEs 145 are used in the position determination of a particular UE 105, UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
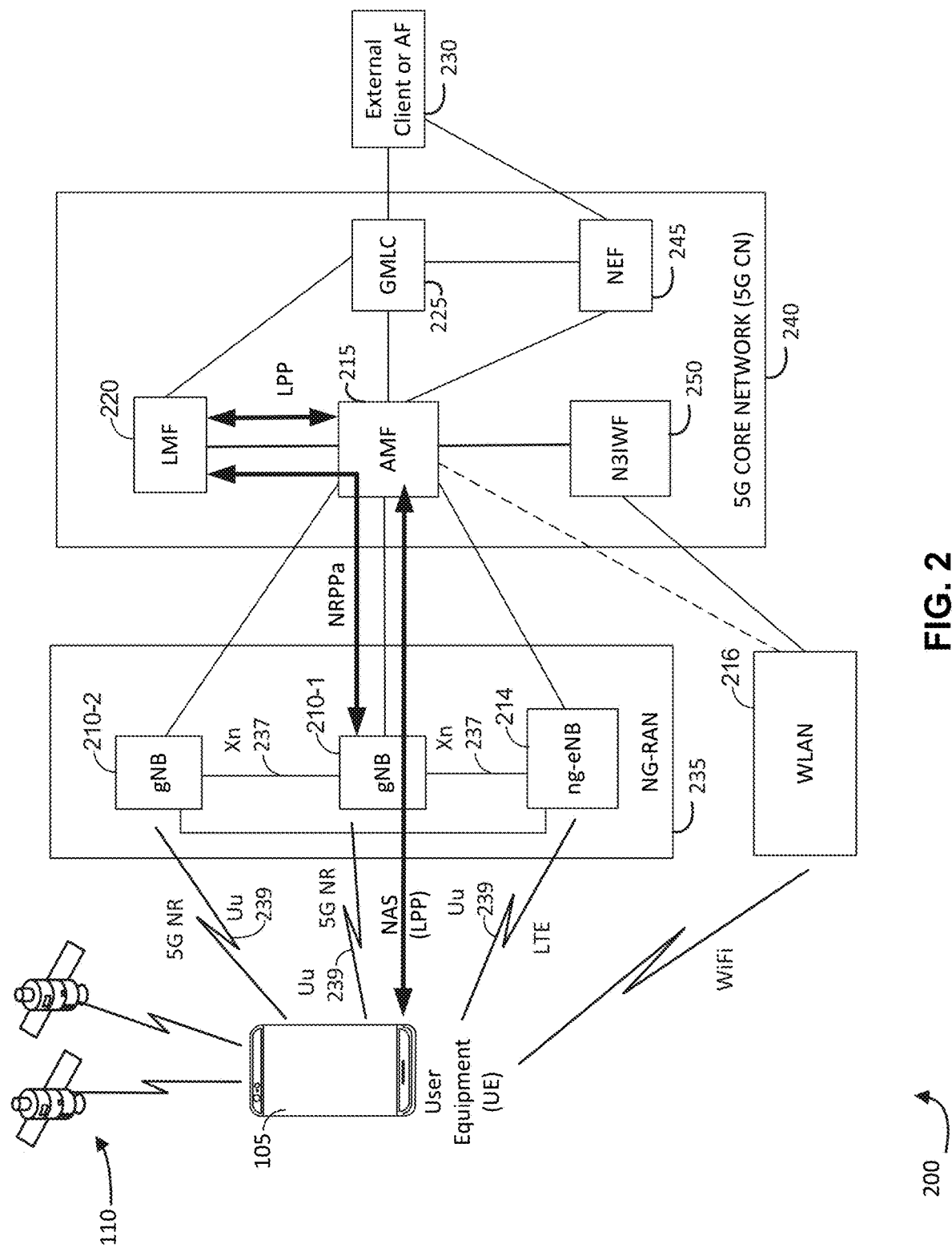
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. 5G NR positioning system 200 may further utilize information from GNSS satellites 110 from a GNSS system like Global Positioning System (GPS) or similar system (e.g., GLONASS, Galileo, Beidou, Indian Regional Navigational Satellite System (IRNSS)). Additional components of 5G NR positioning system 200 are described below. 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding UE 105 (e.g., via the GMLC 225). The external client 230 of FIG. 2 may correspond to external client 180 of FIG. 1, as implemented in or communicatively coupled with a 5G NR network.

UE 105 may include a single entity or may include multiple entities, such as in a personal area network where a user may employ audio, video and/or data I/O devices, and/or body sensors and a separate wireline or wireless modem. An estimate of a location of UE 105 may be referred to as a location, location estimate, location fix, fix, position, position estimate, or position fix, and may be geodetic, thus providing location coordinates for UE 105 (e.g., latitude and longitude), which may or may not include an altitude component (e.g., height above sea level, height above or depth below ground level, floor level or basement level). Alternatively, a location of UE 105 may be expressed as a civic location (e.g., as a postal address or the designation of some point or small area in a building such as a particular room or floor). A location of UE 105 may also be expressed as an area or volume (defined either geodetically or in civic form) within which UE 105 is expected to be located with some probability or confidence level (e.g., 67%, 95%, etc.). A location of UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations in NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between UE 105 and one or more of the gNBs 210, which may provide wireless communications access to the 5G CN 240 on behalf of the UE 105 using 5G NR. The wireless interface between base stations (gNBs 210 and/or ng-eNB 214) and UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

gNBs 210 and ng-eNB 214 can communicate with an AMF 215, which, for positioning functionality, communicates with an LMF 220. AMF 215 may support mobility of UE 105, including cell change and handover of UE 105 from an access node (e.g., gNB 210, ng-eNB 214, or WLAN 216) of a first RAT to an access node of a second RAT. AMF 215 may also participate in supporting a signaling connection to the UE 105 and possibly data and voice bearers for the UE 105. The LMF 220 may support positioning of UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. LMF 220 may also process location service requests for the UE 105, e.g., received from AMF 215 or from GMLC 225. LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at UE 105 (e.g., by measuring downlink PRS (DL-PRS) signals transmitted by wireless nodes such as gNBs 210, ng-eNB 214 and/or WLAN 216, and/or using assistance data provided to UE 105, e.g., by LMF 220).

The Gateway Mobile Location Center (GMLC) 225 may support a location request for UE 105 received from an external client 230 and may forward such a location request to AMF 215 for forwarding by the AMF 215 to LMF 220. A location response from LMF 220 (e.g., containing a location estimate for UE 105) may be similarly returned to GMLC 225 either directly or via the AMF 215, and GMLC 225 may then return the location response (e.g., containing the location estimate) to external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and LMF 220, and/or between an ng-eNB 214 and LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between LMF 220 and AMF 215 using messages for service-based operations (e.g., based on the Hypertext Transfer Protocol (HTTP)) and may be transferred between AMF 215 and UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and LMF 220, via AMF 215 and N3IWF 250 to support network-based positioning of UE 105 and/or transfer of other location information from WLAN 216 to LMF 220. Alternatively, NRPPa messages may be transferred between N3IWF 250 and LMF 220, via AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between UE 105 and LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of UE 105 also may be categorized as UL, DL, or DL-UL based, depending on the types of signals used for positioning. If, for example, positioning is based solely on signals received at UE 105 (e.g., from a base station or other UE), the positioning may be categorized as DL based. On the other hand, if positioning is based solely on signals transmitted by UE 105 (which may be received by a base station or other UE, for example), the positioning may be categorized as UL based. Positioning that is DL-UL based includes positioning, such as RTT-based positioning, that is based on signals that are both transmitted and received by UE 105. Sidelink (SL)-assisted positioning comprises signals communicated between UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
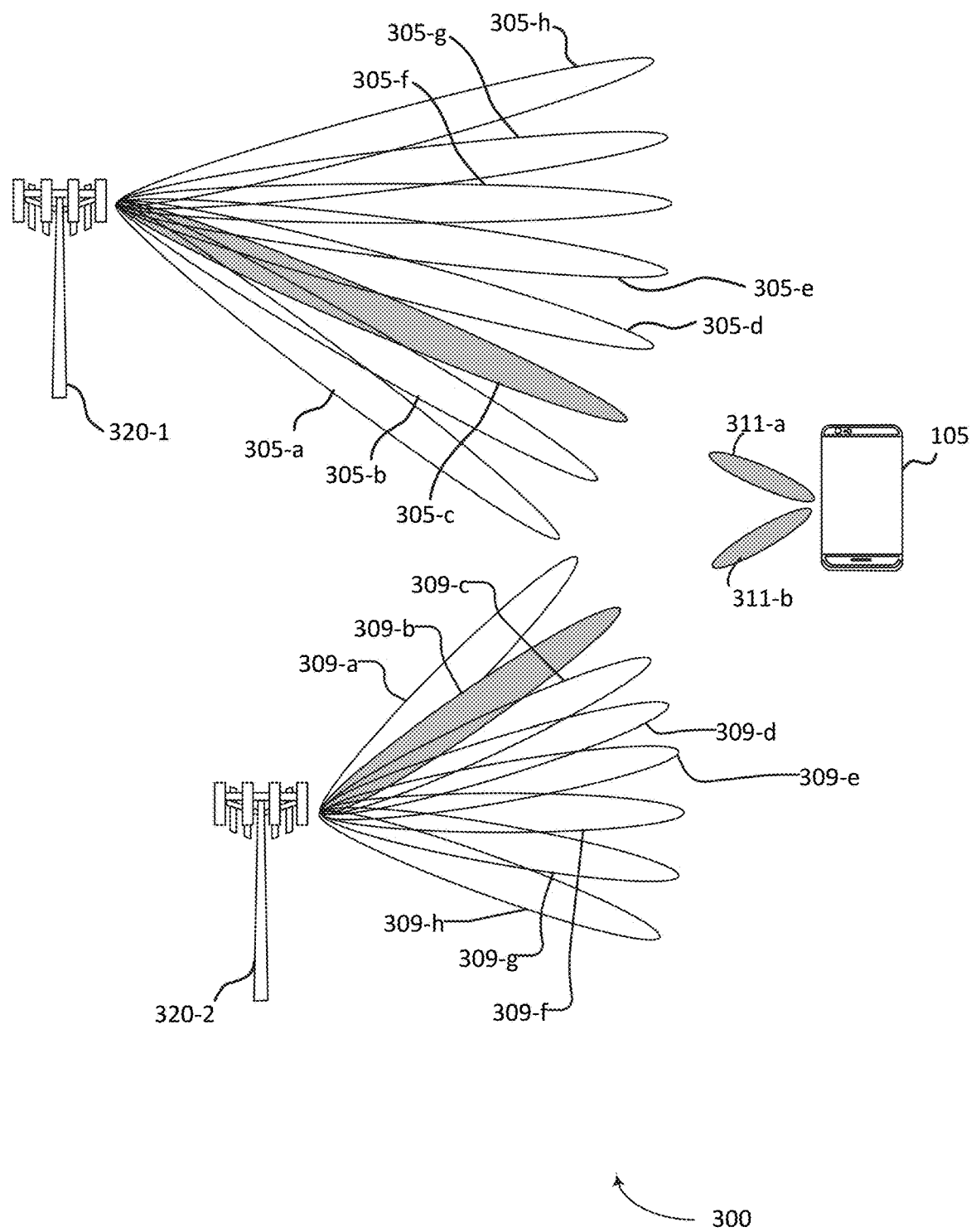
FIG. 3 is a diagram illustrating beamforming in a 5G NR positioning system.

FIG. 3 is a diagram illustrating a simplified environment 300 including two TRPs 320-1 and 320-2 (which may correspond to base stations 120 of FIG. 1 and/or gNBs 210 and/or ng-eNB 214 of FIG. 2) with antenna arrays that can perform beamforming to produce directional beams for transmitting and/or receiving reference signals. FIG. 3 also illustrates a UE 105, which may also use beamforming for transmitting and/or receiving reference signals. Such directional beams are used in 5G NR wireless communication networks. Each directional beam may have a beam width centered in a different direction, enabling different beams of a TRP 320 to correspond with different areas within a coverage area for TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, UE 105 may be capable of using different numbers of beams, which may also correspond to different modes of operation, signal types, etc.

In some situations, a TRP 320 may use beam sweeping. Beam sweeping is a process in which TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-*d*, 309-*e*, 309-*f*, 309-*g*, and 309-*h*. As noted, because UE 105 may also include an antenna array, it can receive RF reference signals transmitted by base stations 120-1 and 120-2 using beamforming to form respective receive beams (Rx beams) 311-*a* and 311-*b*. Beamforming in this manner (by base stations 120 and optionally by UEs 105) can be used to make communications more efficient. They can also be used for other purposes, including taking measurements for position determination (e.g., AoD and AoA measurements).

Figure 4:
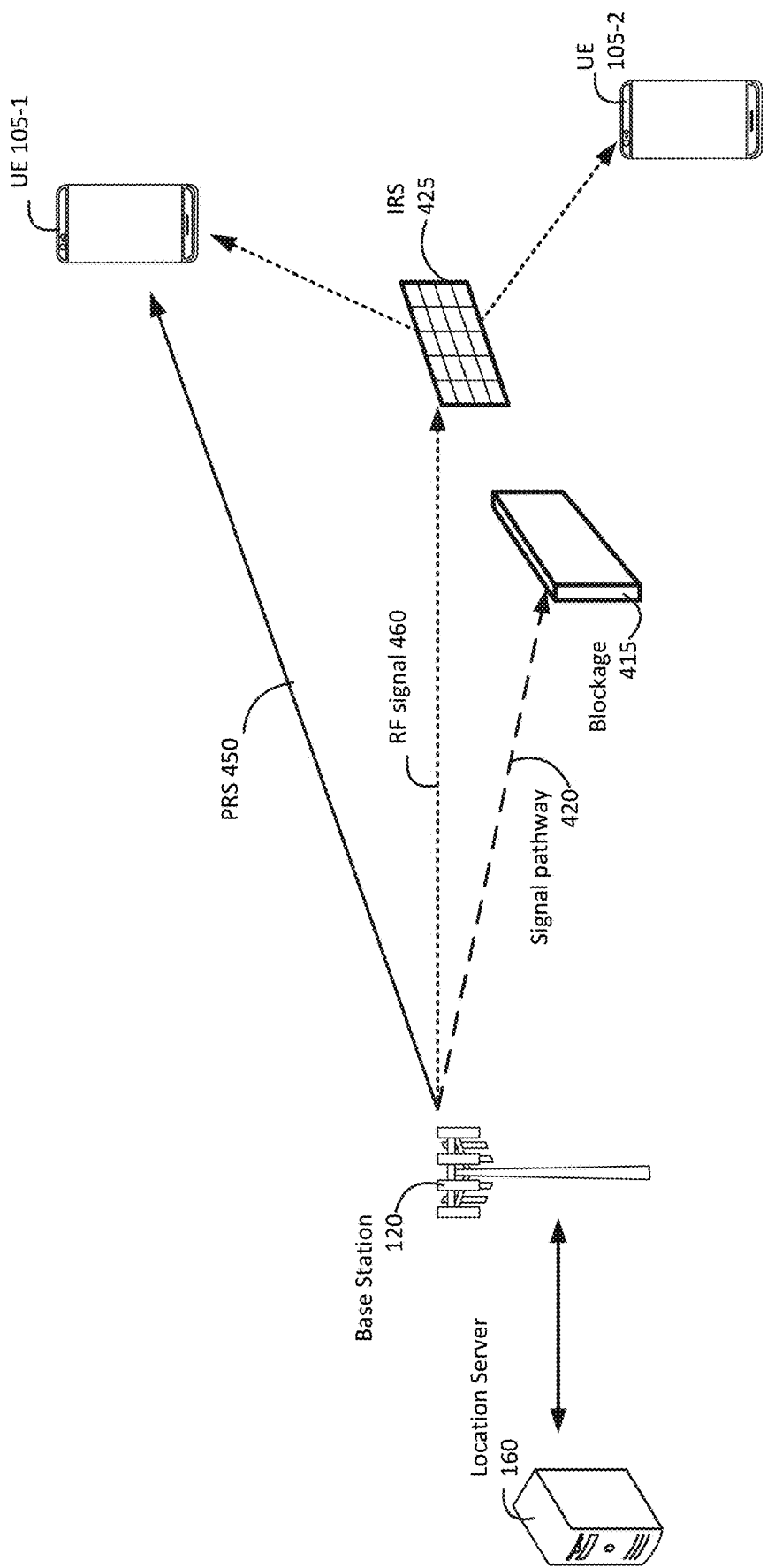
FIG. 4 is a simplified diagram illustrating how an IRS facilitates the transmission of a RF signal in UE positioning.

FIG. 4 is a simplified diagram illustrating how an IRS facilitates the transmission of a RF signal in UE positioning. Specifically, in the given examples, the RF signal is transmitted by a base station 120 (which may comprise a serving base station for UE 105) and received by UE 105-1 and UE 105-2 (collectively and generically referred to herein as UE 105) without and with the presence of an IRS 425 respectively. For example, the RF signal may be directly transmitted from base station 120 to UE 105-1 where the positioning of UE 105-1 may be performed based on the RF signal (e.g., a PRS) transmitted. However, in instances where there is a blockage 415 (e.g., an obstacle such as a wall) blocking a signal pathway 420 from base station 120 to UE 105-2, IRS 425 may be used for transmitting the RF signal.

IRSs (which also may be referred to as a software-controlled metasurfaces, reconfigurable intelligent surface, or reconfigurable reflect arrays/metasurfaces) are garnering recent attention in wireless communication applications as a means to enable propagation paths for RF signals around blockage. Although IRS 425 may be a passive device, it may comprise an array and may therefore redirect RF signals (e.g., RF signal 460) using beamforming. As such, IRS 425 can enable wireless coverage of base station 120 (or, more broadly, the wireless network of base station 120) to extend to otherwise unreachable areas. IRS 425 can do this using a software-controlled reflection/scattering profile to redirect wireless signals toward UE 105 in real time. Additionally or alternatively, IRS 425 may act as a repeater by receiving signals transmitted by a base station 120 and directing them toward a UE 105. (As used herein, "directing," "redirecting," "reflecting," and similar terms used when referring to the functionality of IRS 425 may refer to the reflecting and/or repeating functionality of an IRS.) The functionality of IRS 425 can be controlled by base station 120 and/or UE 105 using a control channel. This adds controllable paths to the channel between base station 120 and UE 105, which is useful in environments with severe blockage 415.

In some embodiments, as disclosed above, in a 5G NR communication system, a UE positioning can be performed based on transmitting a reference signal (e.g., a PRS) from a base station (e.g., base station 120) to a receiving device (e.g., UE 105), the position of which is to be determined (e.g., the object of the positioning process). As noted, in some embodiments, a reference signal (e.g., reference signal 450) may be a reference signal specialized to facilitate positioning, which may be a signal that is not otherwise explicitly defined under 5G (or other 3GPP) standards.

According to embodiments disclosed herein, in some instances, UE positioning (e.g., based on PRSs) may be accomplished by transmitting the reference signal 450 (e.g., a PRS) from a base station 120 to UE 105-1 directly (e.g., when there is no blockage blocking the transmission path between base station 120 and UE 105-1) and determining the position of UE 105-1 based on measurements generated using reference signal 450 (e.g., TDOA, AoA, AoD, RSTD, RTT, and/or multi-cell RTT). In some embodiments, the UE positioning processes may be facilitated with the use of a location server 160. Depending on the type of the positioning (e.g., a UE-based positioning or a UE assisted positioning) and/or the desired functionality, UE 105-1 or location server 160 may be used to determine/calculate the location of UE 105-1 based on the measurements.

In some other instances where a blockage 415 blocks a signal pathway 420 from base station 120 to UE 105-2, a RF signal 460 may be transmitted using an IRS 425 to redirect RF signal 460 to UE 105-2. In situations where an IRS is being used for facilitating the transmission of the RF signal, a location of IRS 425 needs to be determined/known in order to perform positioning of UE 105-2. In some embodiments, as described in greater details below, a transmitting device capable of transmitting, receiving, and determining measurements based on RF signals (e.g., wireless reference signals) may be configured for determining a location of IRS 425.

For a non-limiting example, when determining the location of IRS 425, a wireless communication device with a known location (e.g., UE 105-1 after determining the location, a UE with a known location, and/or other positioning reference unit (PRU)) may be used when there is no blockage blocking the signal pathway from a base station (e.g., base station 120) to the wireless communication device. For example, upon receiving a request to position an IRS (e.g., IRS 425), a location server (e.g., location server 160) may transmit a request configuring the base station to enable the IRS for transmitting/redirecting reference signals. Accordingly, a reference signal may be transmitted from the base station to the wireless communication device through both a direct pathway (e.g., directly from base station 120 to UE 105-1) and an indirect pathway (e.g., from base station 120 to IRS 425 then to UE 105-1). Measurements such as TDOA, RTT, AoD, and/or AoA of the reference signal transmitted on both pathways may be determined by the base station and/or the wireless communication device. The measurements may then be transmitted to the location server for determining the location of the IRS.

It can be noted that, although a single base station 120, a single IRS 425, and two UEs 105 are illustrated in FIG. 4, embodiments are not so limited. According to some embodiments, configurations may be used in which there are a plurality of base stations 120 (transmitters), a plurality of IRS 425, and/or a different number of UEs 105 (receivers). Further, it can be noted that the receiving device in a configuration for UE positioning may not be limited to UE 105. The receiving device may comprise, for example, another base station 120 (e.g., a regular gNB or small cell gNB). Furthermore, in instances in which multiple receiving devices are used, a single IRS may reflect signals to multiple receiving devices and/or multiple IRSs may be used to reflect signals to multiple receiving devices.

Figure 5:
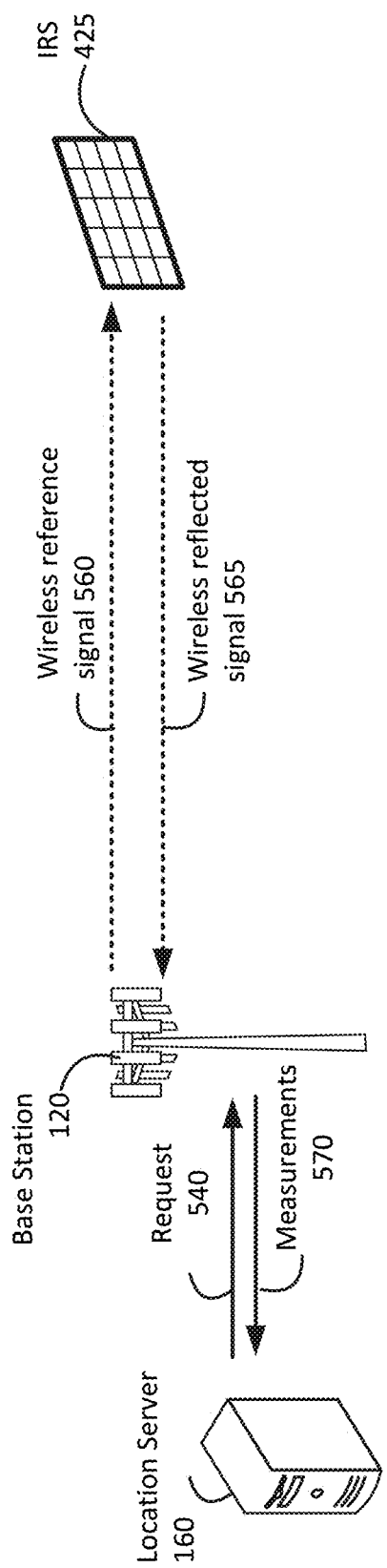
FIG. 5 is a simplified diagram illustrating how an IRS may be positioned, according to some embodiments.
Figure 6:
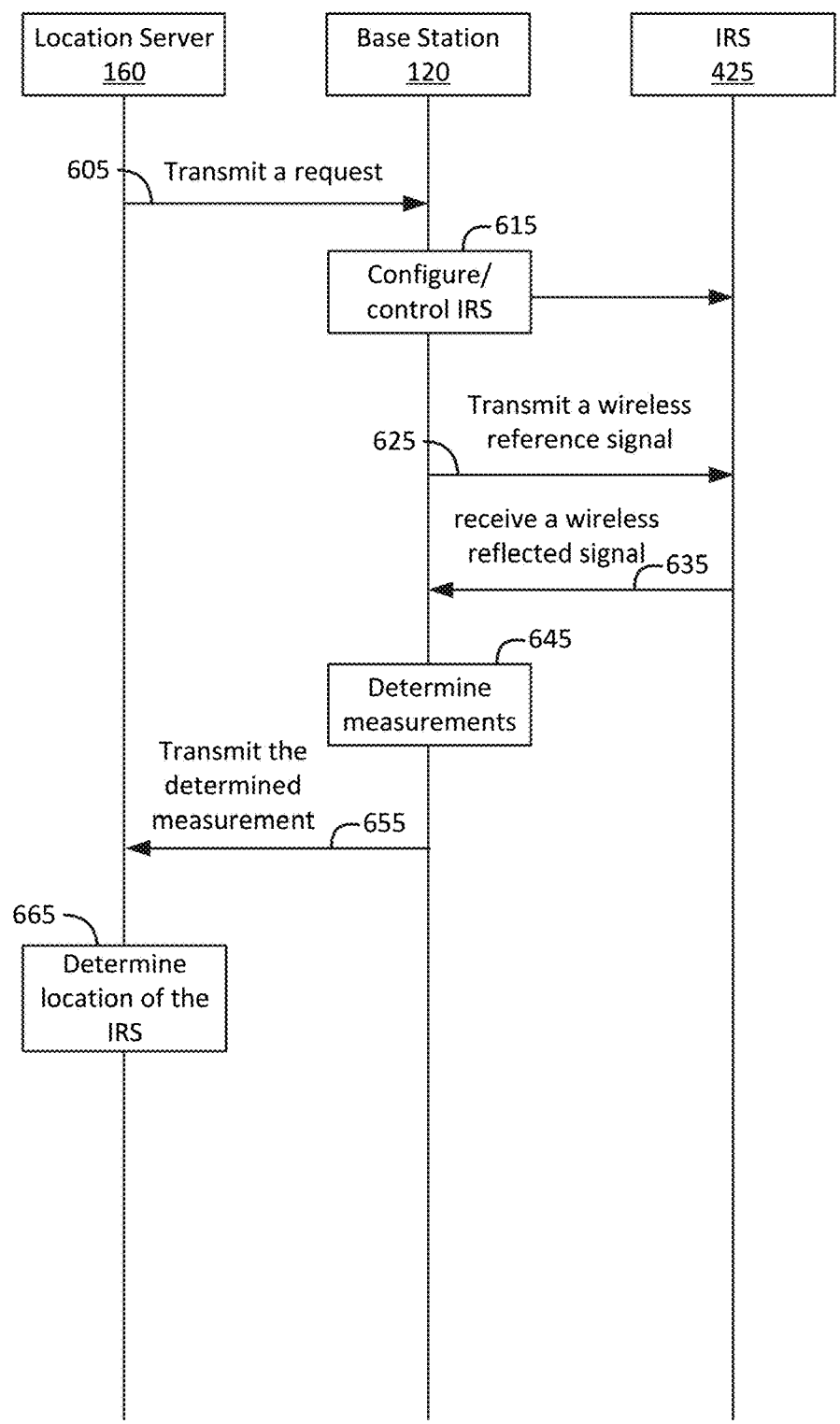
FIG. 6 is a call-flow diagram of a process of performing position determination of the IRS, according to some embodiments.

In some embodiments, the transmitting device configured for positioning IRS 425 may comprise a base station (e.g., base station 120). For example, FIG. 5 is a simplified diagram illustrating positioning of an IRS using a base station in a wireless communication system according to certain embodiments. FIG. 6 is a call-flow diagram illustrating a process of positioning of the IRS using the base station, according to an embodiment. For ease of illustration, FIGS. 5 and 6 will be described together. As with the other figures provided herein, FIGS. 5 and 6 are provided as a nonlimiting example. As discussed in more detail below, alternative embodiments may perform certain functions in a different order, simultaneously, etc. It can be noted that arrows between the various components illustrated in FIG. 6 illustrate messages or information sent from one component to another. Further (although not explicitly indicated in FIG. 6), communications between base station 120 and IRS 425, and between base station 120 and location server 160 may occur in a manner similar to the process illustrated in FIG. 4.

As illustrated in FIG. 6, starting at arrow 605, location server 160 may transmit a request to base station 120 configuring base station 120 to perform positioning of IRS 425. For example, as illustrated in FIG. 5, when positioning an IRS 425, location server 160 may transmit a request 540 to base station 120 configuring base station 120 to perform positioning of IRS 425. In some embodiments, the communication between location server 160 and base station (e.g., transmission of request 540 and measurements 570) may be based on New Radio (NR) Positioning Protocol annex (NRPPa) Protocol.

At block 615, base station 120 may configure IRS 425 to reflect a wireless reference signal transmitted from base station 120 back to base station 120. For example, as illustrated in FIG. 5, upon receiving request 540, base station 120 may configure IRS 425 to reflect a wireless reference signal transmitted from base station 120 back to base station 120 (e.g., configuring a 180-degree reflection of wireless reference signal(s) received by IRS 425). Specifically, base station 120 may communicate with a controller (not shown) of IRS 425 to control through a control channel. The controller may configure a software-controlled reflection/scattering profile to reflect the wireless reference signal back to base station 120 in real time.

Subsequently, at arrow 625, base station 120 may transmit a RF signal to IRS 425. For example, as illustrated in FIG. 5, base station 120 may transmit a RF signal (e.g., a wireless reference signal 560) to IRS 425 subsequent to configuring IRS 425 to reflect the wireless reference signal transmitted from base station 120 back to transmitting device base station 120. In some embodiments, depending on the type of positioning (e.g., UL, DL, or DL-UL based), the types of wireless reference signal 560 may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc.

At arrow 635, base station 120 may receive a wireless reflected signal reflected from IRS 425. For example, as illustrated in FIG. 5, base station 120 may receive a wireless reflected signal 565 including the reflection (e.g., a 180-degree reflection reflected by IRS 425) of wireless reference signal 560.

At block 645, base station 120 may determine measurements such as RTT, AoD, AoA, etc., based at least in part on wireless reflected signal 560. At arrow 655, base station 120 may transmit the determined measurements to location server 160 for determining the location of IRS 425. For example, as illustrated in FIG. 5, base station 120 may determine measurement 570 based at least in part on wireless reference signal 560 and wireless reflected signal 565. For example, RTT may be determined based on a time difference at base station 120 between transmitting wireless reference signal 560 and receiving wireless reflected signal 565, AoD may be based on a measurement to determine an angle at which the wireless reference signal 560 is transmitted by base station 120, and AoA may be based on a measurement made when wireless reflected signal 565 is received by base station 120 to determine an incoming angle.

Accordingly, at arrow 655, the determined measurements may further be transmitted by base station 120 to location server 160. At block 665, location server 160 may determine the location of IRS 425 based on the measurements received from base station 120. For example, the location of IRS 425 may be determined/calculated based on the determined measurements according to at least the configuration illustrated below along with the description of FIG. 7 below.

In some embodiments, the determined measurement may also be configured for verifying/validating if wireless reflected signal 565 reflected from IRS 425 includes the reflection of wireless reference signal 560. For example, AoA of wireless reflected signal 565 may be used for determining if wireless reflected signal 565 reflected from IRS 425 includes the reflection of wireless reference signal 560. Specifically, in some embodiments, the verification/validation may be performed based on comparing if the AoA of wireless reflected signal 565 equals to or substantially equals to the AoD of wireless reference signal 560. For example, if AoA $\theta_A \cong$ AoD $\theta_D$, then the wireless reflected signal 565 may be determined as including the reflection of wireless reference signal 560.

In some further embodiments, uncertainty of the determined position of the IRS may be determined based on the difference between the IRS positions determined based on the AoA of wireless reflected signal 565 and based on the AoD of wireless reference signal 560. For example, if the difference between the IRS positions determined based on the AoA of wireless reflected signal 565 and based on the AoD of wireless reference signal 560 is 1 cm (e.g., the two determined position of IRS is separated by 1 cm), then the uncertainty of the determined IRS position may be considered as 1 cm. In some embodiments, the uncertainty information can be shared with location server 160 for further use. In some embodiments, the uncertainty can be reduced if the same position determination process is repeated by/between multiple transmitting/receiving devices.

Figure 7:
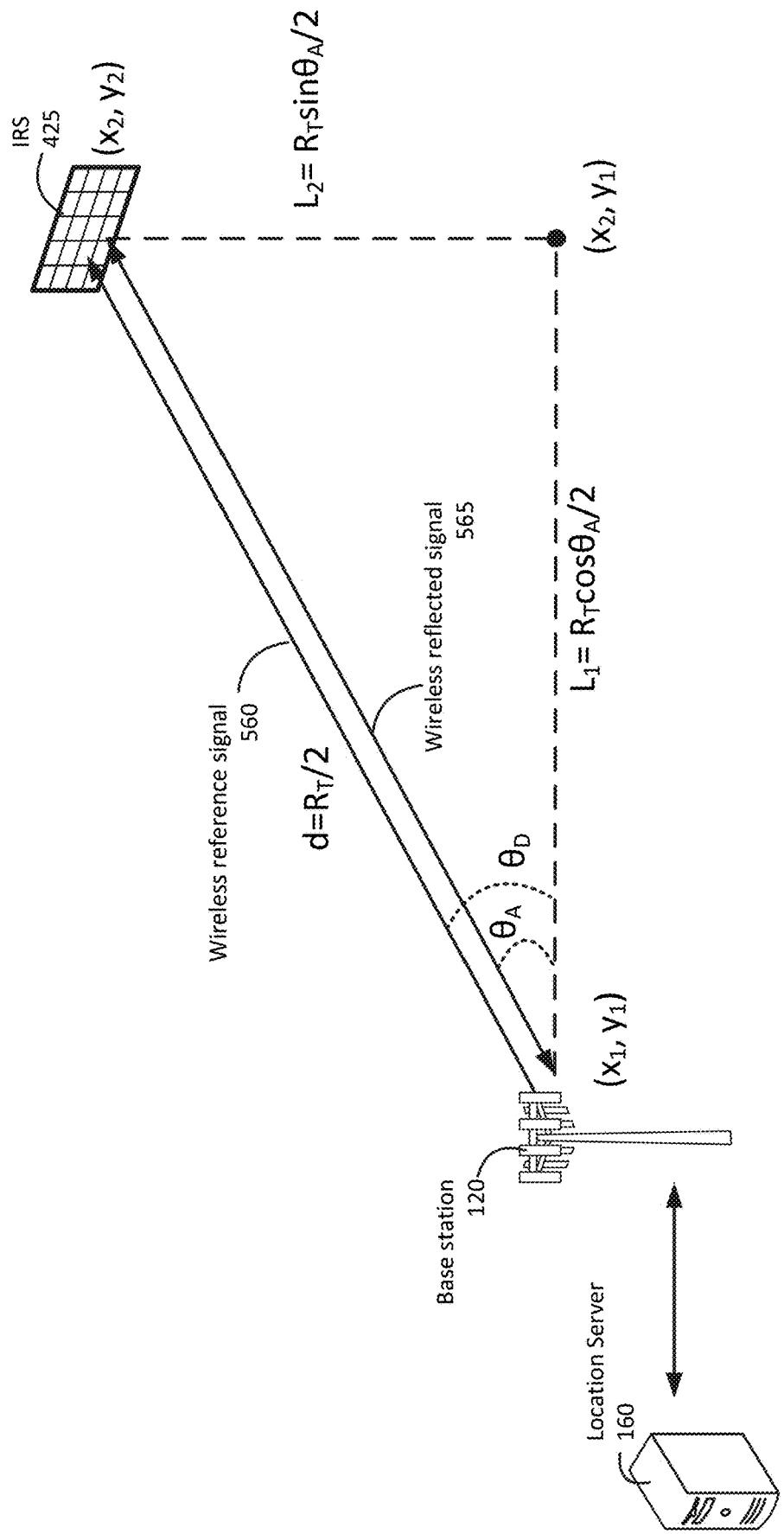
FIG. 7 is a simplified diagram illustrating how a location of an IRS may be determined, according to some embodiments

FIG. 7 is a simplified diagram illustrating how a location of an IRS may be determined, according to some embodiments. In some embodiments, the position of the IRS (e.g., IRS 425) can be determined mathematically by using measurements determined based on wireless reference signal 560 and wireless reflected signal 565. For example, RTT RT between the transmitting device (e.g., base station 120) and IRS 425 may be determined based on a time difference at the transmitting device between transmitting wireless reference signal 560 and receiving wireless reflected signal 565. In some embodiments, AoA $\theta_A$ of wireless reflected signal 565 and/or AoD $\theta_D$ of wireless reference signal 560 may be determined based on the RSRP of the reference signal (e.g., wireless reference signal 560 and/or wireless reflected signal 565) and/or phase difference among signals received by each element of the antenna array of the transmitting/receiving device. It can be noted that the reference direction from which the angle $\theta_A$ (also angle $\theta_D$) is measured may be measured from true north or based on any coordinate system used by the network for positioning (e.g., geographical coordinates, East-North-Up (ENU), etc.). As noted hereafter, solving for location of IRS 425 (e.g., solving the coordinate $(x_2, y_2)$ can be accomplished based on a known position of the transmitting device with the coordinate $(x_1, y_1)$, and a relative location of IRS 425 $(L_1, L_2)$ to the transmitting device.

Specifically, after determining that wireless reflected signal 565 includes the reflection of wireless reference signal 560 (e.g., $\theta_A \cong \theta_D$) as illustrated in FIG. 7, the distance between transmitting device (e.g., base station 120) and IRS 425 d may be determined according to:

$$d = \frac{R_T}{2} \quad (1)$$

Accordingly, the relative location of IRS 425 may be determined according to:

$$L_1 = d * \cos\theta_A = \frac{R_T}{2}\cos\theta_A \quad (2)$$

$$L_2 = d * \sin\theta_A = \frac{R_T}{2}\sin\theta_A \quad (3)$$

The location of IRS 425 may then be determined according to:

$$x_2 = x_1 + L_1 = x_1 + \frac{R_T}{2}\cos\theta_A \quad (4)$$

$$y_2 = y_1 + L_2 = y_1 + \frac{R_T}{2}\sin\theta_A \quad (5)$$

Because wireless reference signal 560 is reflected by IRS 425 in real time (e.g., without processing delay), RTT determined based on the time difference at the transmitting device between transmitting wireless reference signal 560 and receiving wireless reflected signal 565 is accurate. Accordingly, the determination of the location of IRS 425 $(x_2, y_2)$ is accurate.

Figure 8:
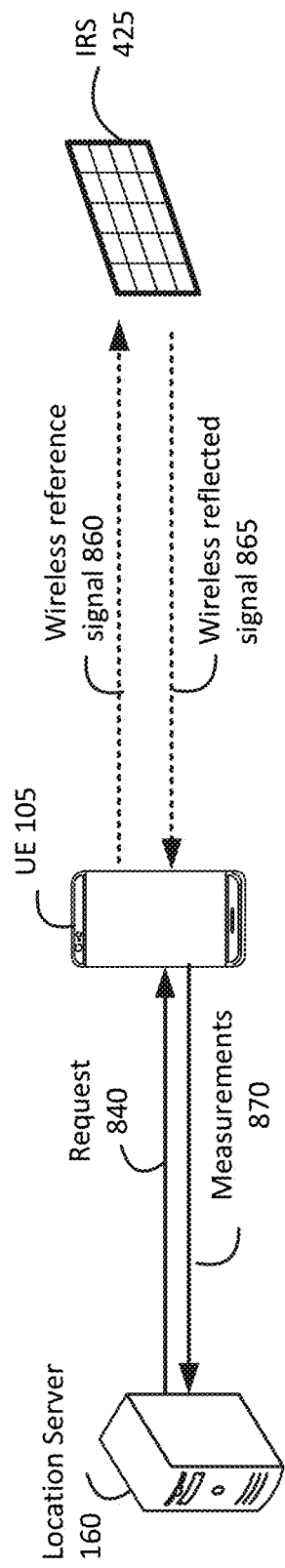
FIG. 8 is a simplified diagram illustrating how an IRS may be positioned, according to some embodiments.
Figure 9:
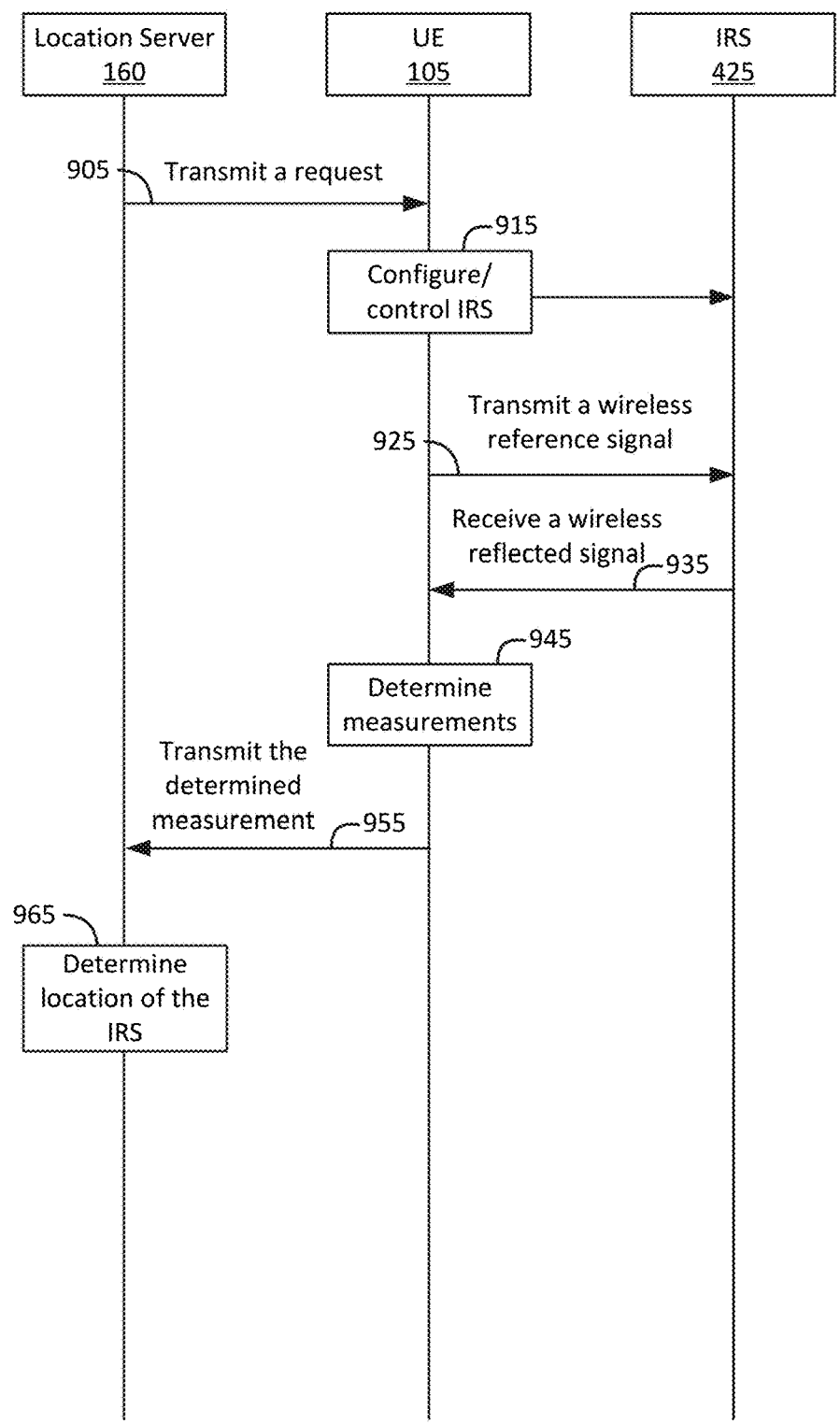
FIG. 9 is a call-flow diagram of a process of performing position determination of the IRS, according to some embodiments.

In some other embodiments, the transmitting device configured for positioning IRS 425 may also comprise a UE (e.g., UE 105). For example, FIG. 8 is a simplified diagram illustrating positioning of an IRS using a UE in a wireless communication system according to certain embodiments. FIG. 9 is a call-flow diagram illustrating a process of positioning of the IRS using the UE, according to an embodiment. For ease of illustration, FIGS. 8 and 9 will be described together. As with the other figures provided herein, FIGS. 8 and 9 are provided as a nonlimiting example. As discussed in more detail below, alternative embodiments may perform certain functions in a different order, simultaneously, etc. It can be noted that arrows between the various components illustrated in FIG. 9 illustrate messages or information sent from one component to another. Further (although not explicitly indicated in FIG. 9), communications between UE 105 and IRS 425, and between UE 105 and location server 160 may occur in a manner similar to the process illustrated in FIG. 4.

As illustrated in FIG. 9, starting at arrow 905, location server 160 may transmit a request to UE 105, configuring UE 105 to perform positioning of IRS 425. For example, as illustrated in FIG. 8, when positioning an IRS 425, location server 160 may transmit a request 840 to UE 105 configuring UE 105 to perform positioning of IRS 425. In some embodiments, the communication between location server 160 and UE 105 (e.g., transmission of request 840 and measurements 870) may be based on Long-Term Evolution (LTE) Positioning Protocol (LPP).

At block 915, UE 105 may configure IRS 425 to reflect a wireless reference signal transmitted from UE 105 back to UE 105. For example, as illustrated in FIG. 8, upon receiving request 840, UE 105 may configure IRS 425 to reflect a wireless reference signal transmitted from UE 105 back to UE 105 (e.g., configuring a 180-degree reflection of wireless reference signal(s) received by IRS 425). Specifically, UE 105 may communicate with a controller (not shown) of IRS 425 to control through a control channel. The controller may configure a software-controlled reflection/scattering profile to reflect the wireless reference signal back to UE 105 in real time.

Subsequently, at arrow 925, UE 105 may transmit a RF signal to IRS 425. For example, as illustrated in FIG. 8, UE 105 may transmit a RF signal (e.g., a wireless reference signal 860) to IRS 425 subsequent to configuring IRS 425 to reflect the wireless reference signal transmitted from UE 105 back to UE 105. In some embodiments, depending on the type of positioning (e.g., UL, DL, or DL-UL based), the types of wireless reference signal 860 may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Accordingly, at arrow 935, upon receiving wireless reference signal 860, IRS 425 may reflect wireless reference signal 860 back to UE 105 in real time.

At arrow 935, UE 105 may receive a wireless reflected signal reflected from IRS 425. For example, as illustrated in FIG. 8, UE 105 may receive a wireless reflected signal 865 including the reflection (e.g., a 180-degree reflection reflected by IRS 425) of wireless reference signal 860.

At block 945, UE 105 may determine measurements such as RTT, AoD, AoA, etc., based at least in part on wireless reference signal 860 and wireless reflected signal 865. At arrow 955, UE 105 may transmit the determined measurements to location server 160 for determining the location of IRS 425. For example, as illustrated in FIG. 8, UE 105 may determine measurement 870 based at least in part on wireless reference signal 860 and wireless reflected signal 865. For example, RTT may be determined based on a time difference at UE 105 between transmitting wireless reference signal 860 and receiving wireless reflected signal 865, AoD may be determined at or at about the time point when wireless reference signal 860 is transmitted by UE 105, and AoA may be determined at or at about the time point when wireless reflected signal 865 is received by UE 105.

Accordingly, at arrow 955, the determined measurements may further be transmitted by UE 105 to location server 160. At block 965, location server 160 may determine the location of IRS 425 based on the measurements received from base station 120. For example, the location of IRS 425 may be determined/calculated based on the determined measurements similar to block 665 in FIG. 6 (e.g., according to the configuration disclosed along with the description of FIG. 7). In some embodiments, the determined measurement may also be configured for verifying/validating if wireless reflected signal 865 reflected from IRS 425 includes the reflection of wireless reference signal 860. For example, AoA of wireless reflected signal 565 may be used for determining if wireless reflected signal 565 reflected from IRS 425 includes the reflection of wireless reference signal 860. Specifically, the verification/validation may be performed based on determining reference signal received power (RSRP) of wireless reflected signal 865 (e.g., beams with different angles).

In some further embodiments, when the transmitting device configured for positioning IRS 425 comprises a UE (e.g., UE 105), the positioning of IRS 425 may be performed without the participation of location server 160 (e.g., in a UE-based positioning). For example, in a UE-based positioning scheme, UE 105 may initiate the IRS positioning process and may determine the location of the IRS based on the measurements instead of transmitting the measurements to a location server for location determination.

Figure 10:
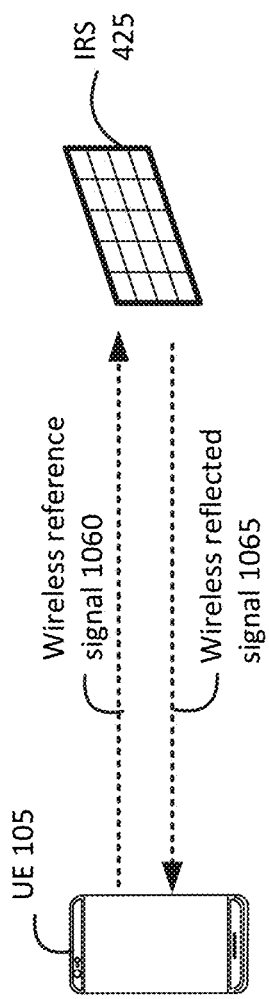
FIG. 10 is a simplified diagram illustrating how an IRS may be positioned, according to some embodiments.
Figure 11:
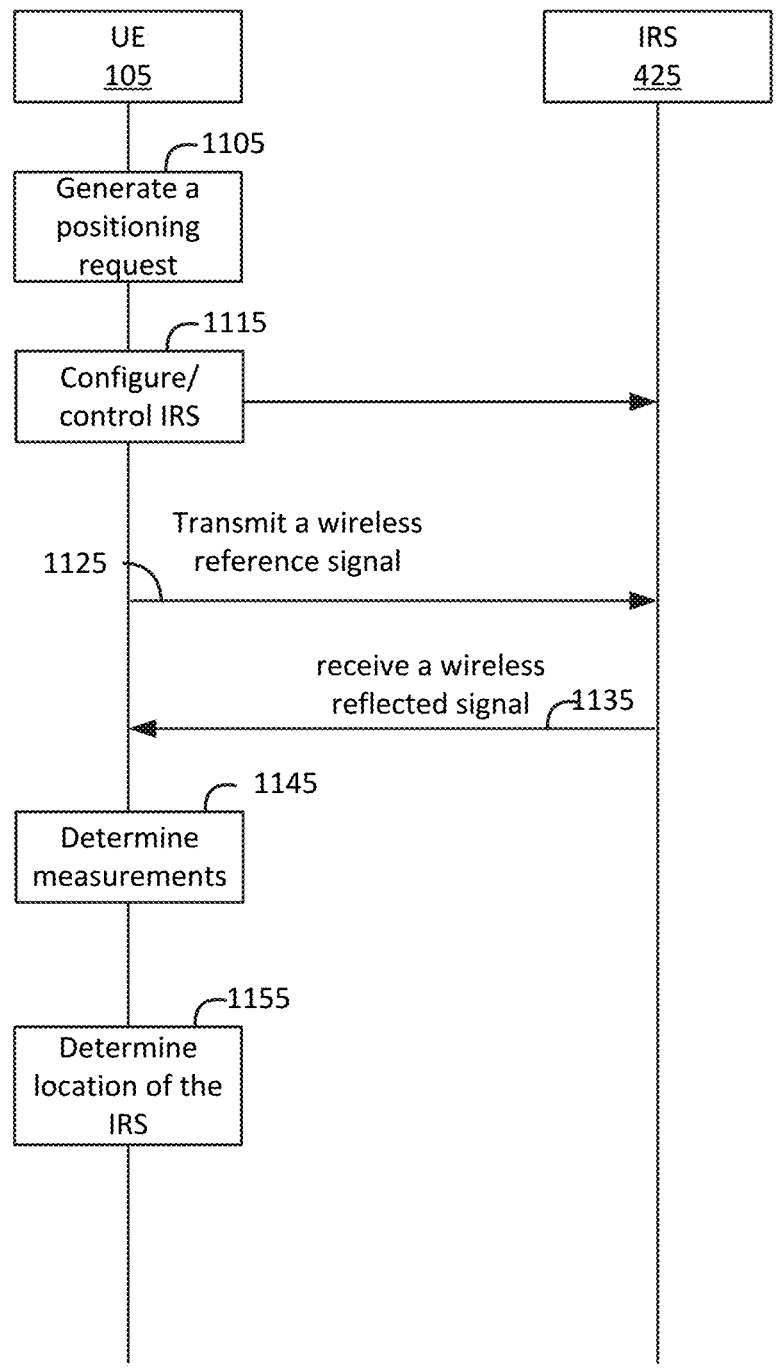
FIG. 11 is a call-flow diagram of a process of performing position determination of the IRS, according to some embodiments.

For example, FIG. 10 is a simplified diagram illustrating positioning of an IRS using a UE in a wireless communication system according to certain embodiments. FIG. 11 is a call-flow diagram illustrating a process of positioning of the IRS using the UE, according to an embodiment. For ease of illustration, FIGS. 10 and 11 will be described together. As with the other figures provided herein, FIGS. 10 and 11 are provided as a nonlimiting example. As discussed in more detail below, alternative embodiments may perform certain functions in a different order, simultaneously, etc. It can be noted that arrows between the various components illustrated in FIG. 11 illustrate messages or information sent from one component to another. Further (although not explicitly indicated in FIG. 9), communications between UE 105 and IRS 425, may occur in a manner similar to the process illustrated in FIG. 4.

As illustrated in FIG. 11, at block 1105, UE 105 may generate a positioning request. This position request may come, for example, from an application (or app) executed by UE 105. This may be a result from user interaction with UE 105, based on a determined schedule, or based on other triggers (including user input).

At block 1115, UE 105 may configure IRS 425 to reflect a wireless reference signal transmitted from UE 105 back to UE 105. For example, as illustrated in FIG. 10, UE 105 may configure IRS 425 to reflect a wireless reference signal transmitted from UE 105 back to UE 105 (e.g., configuring a 180-degree reflection of wireless reference signal(s) received by IRS 425). Specifically, UE 105 may communicate with a controller (not shown) of IRS 425 to control through a control channel. The controller may configure a software-controlled reflection/scattering profile to reflect the wireless reference signal back to UE 105 in real time.

Subsequently, at arrow 1125, UE 105 may transmit a RF signal to IRS 425. For example, as illustrated in FIG. 10, UE 105 may transmit a RF signal (e.g., a wireless reference signal 1060) to IRS 425 subsequent to configuring IRS 425 to reflect the wireless reference signal transmitted from UE 105 back to UE 105. In some embodiments, depending on the type of positioning (e.g., UL, DL, or DL-UL based) the types of wireless reference signal 1060 may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc.

At arrow 1135, UE 105 may receive a wireless reflected signal reflected from IRS 425. For example, as illustrated in FIG. 10, UE 105 may receive a wireless reflected signal 1065 including the reflection (e.g., a 180-degree reflection reflected by IRS 425) of wireless reference signal 1060.

At block 1145, UE 105 may determine measurements such as RTT, AoD, AoA, etc., based at least in part on wireless reference signal 1060 and wireless reflected signal 1065. For example, UE 105 may determine measurements based at least in part on wireless reference signal 1060 and wireless reflected signal 1065. For example, RTT may be determined based on a time difference at UE 105 between transmitting wireless reference signal 1060 and receiving wireless reflected signal 1065, AoD may be determined at or at about the time point when wireless reference signal 1060 is transmitted by UE 105, and AoA may be determined at or at about the time point when wireless reflected signal 865 is received by UE 105.

At block 1155, UE 105 may determine the location of IRS 425 based on the determined measurements. For example, the location of IRS 425 may be determined/calculated based on the determined measurements similar to block 665 in FIG. 6 and block 965 in FIG. 9 (e.g., according to the configuration disclosed along with the description of FIG. 7). In some embodiments, the determined measurement may also be configured for verifying/validating if wireless reflected signal 1065 reflected from IRS 425 includes the reflection of wireless reference signal 1060. For example, AoA of wireless reflected signal 1065 may be used for determining if wireless reflected signal 1065 reflected from IRS 425 includes the reflection of wireless reference signal 1060. Specifically, the verification/validation may be performed based on determining reference signal received power (RSRP) of wireless reflected signal 565 (e.g., beams with different angles).

Figure 12:
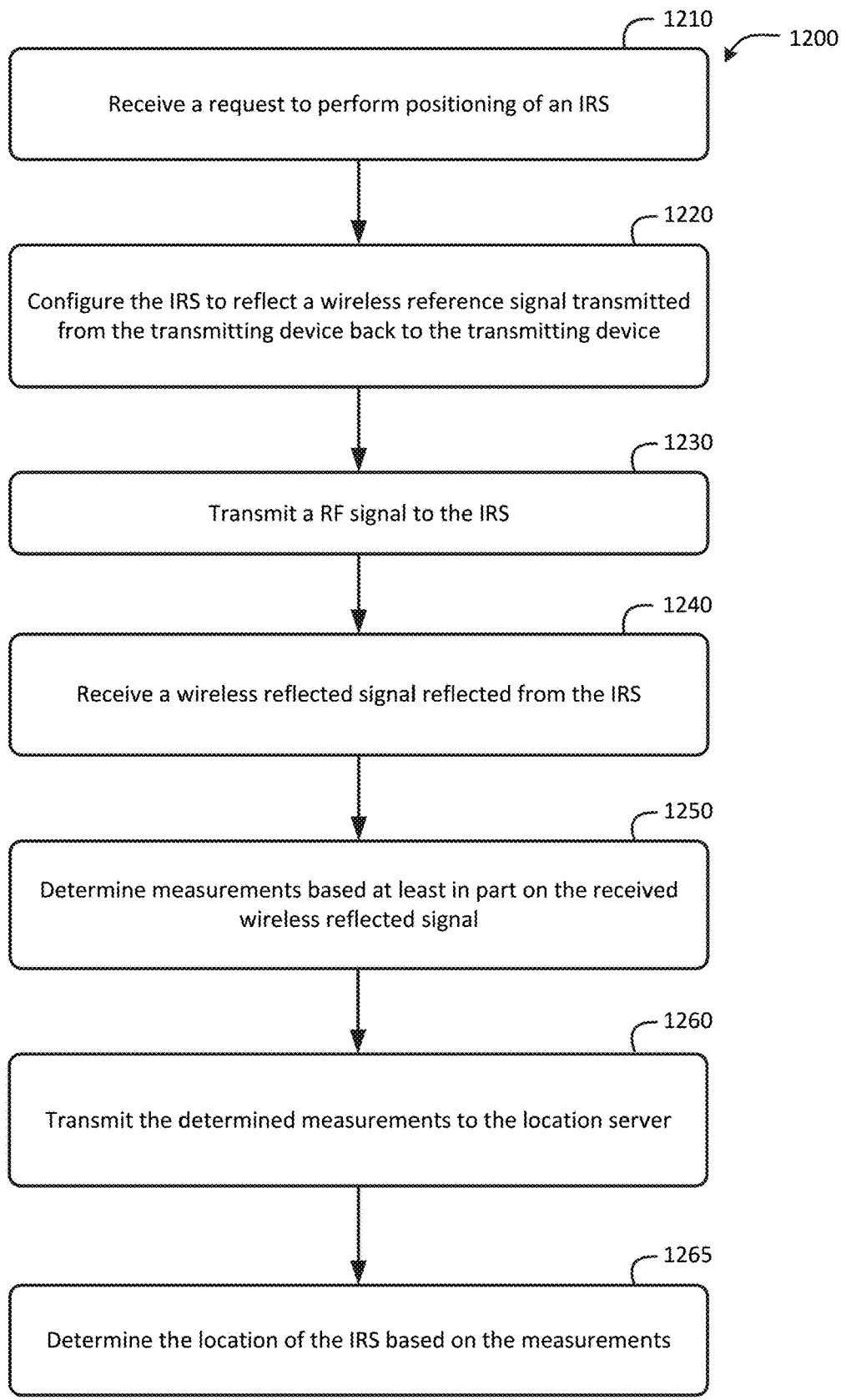
FIGS. 12 and 13 are flow diagrams of methods of IRS positioning performed by a transmitting device, according to an embodiment.
Figure 14:
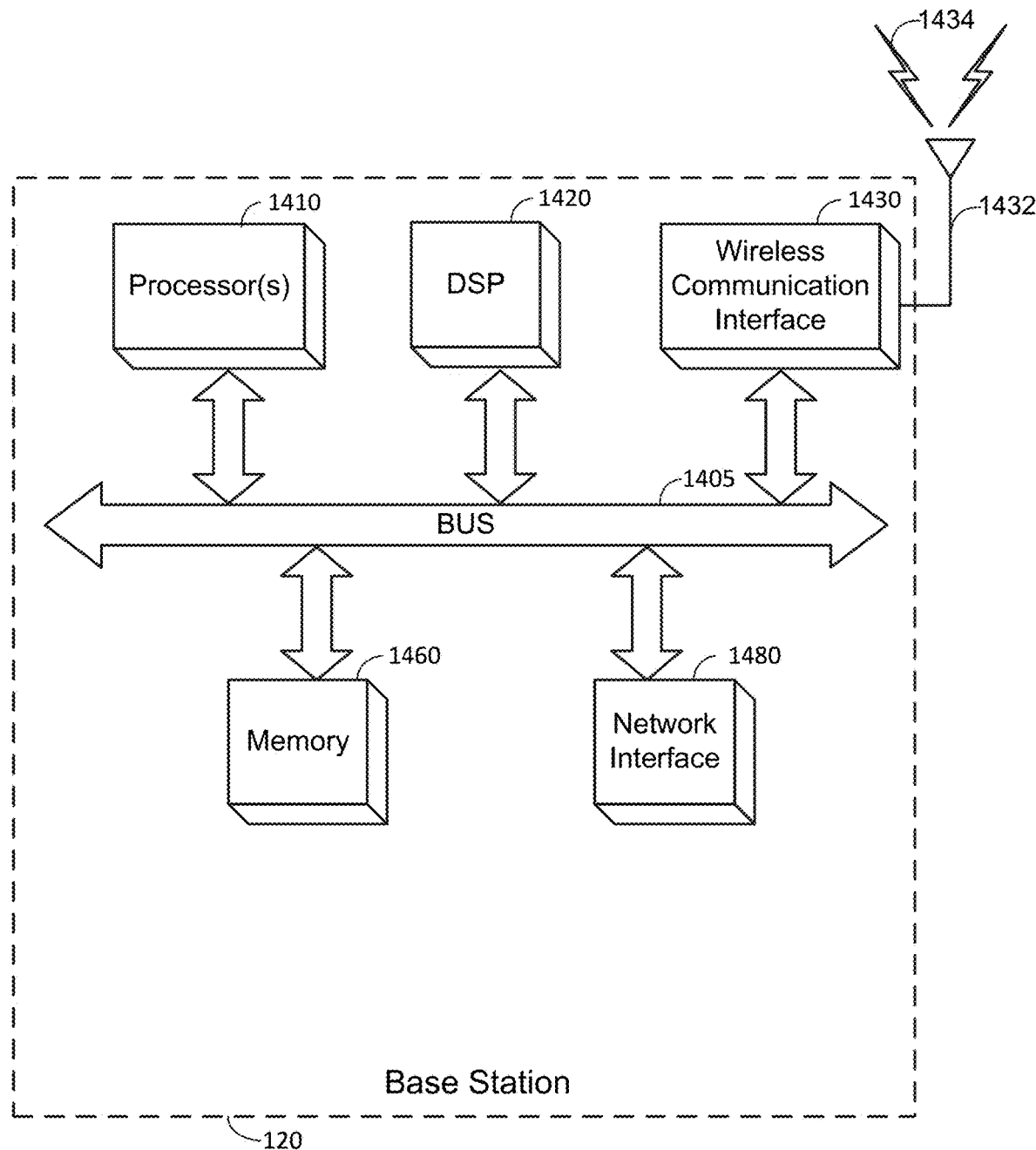
FIG. 14 is a block diagram of an embodiment of a base station, which can be utilized in embodiments as described herein.
Figure 15:
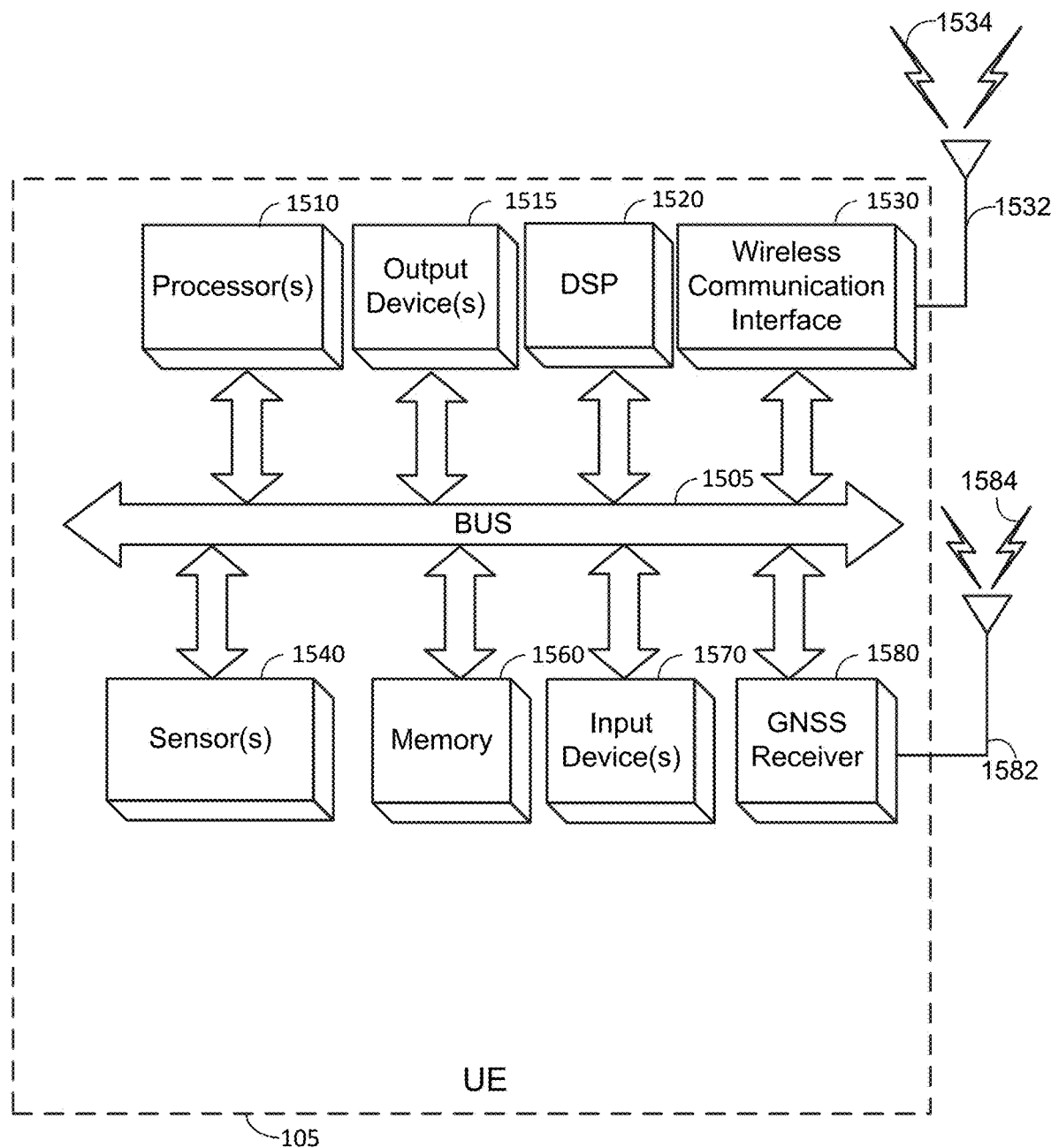
FIG. 15 is a block diagram of an embodiment of a UE, which can be utilized in embodiments as described herein.

FIG. 12 is a flow diagram of a method 1200 of IRS positioning performed by a transmitting device in a wireless communication network, according to an embodiment. Means for performing the functionality illustrated in one or more of the blocks shown in FIG. 12 may be performed by hardware and/or software components of a base station (e.g., base station 120 in FIGS. 1, 4, 5, and 6, gNB 210 and/or the ng-eNB 214 in FIG. 2, and/or TRPs 320 in FIG. 3), and/or a UE (e.g., UE 105 in FIGS. 1-6, and 8). Example components of the transmitting device (e.g., base station 120 and/or UE 105) are illustrated in FIGS. 14 and 15 respectively, which is described in more detail below.

At block 1210, the functionality comprises receiving a request, by a transmitting device, requesting the transmitting device to perform positioning of an IRS (e.g., IRS 425). Means for performing functionality at block 1210 may comprise a wireless communications interface 1430 and/or other components of a base station (e.g., base station 120), as illustrated in FIG. 14. Means for performing functionality at block 1210 may also comprise a wireless communications interface 1530 and/or other components of a UE (e.g., UE 105), as illustrated in FIG. 15. Specifically, as noted above, if the transmitting device comprises a base station, the base station may receive a request from a location server (e.g., location server 160) configuring the base station to perform positioning of an IRS. Alternatively, if the transmitting device comprises a UE, the UE may receive a request from the location server (e.g., location server 160) configuring the UE to perform positioning of the IRS.

At block 1220, the functionality comprises configuring the IRS, by the transmitting device, to reflect a wireless reference signal transmitted from the transmitting device back to the transmitting device. Means for performing functionality at block 1220 may comprise a processor 1410 and/or other components of a base station (e.g., base station 120), as illustrated in FIG. 14. Means for performing functionality at block 1210 may also comprise a processor 1510 and/or other components of a UE (e.g., UE 105), as illustrated in FIG. 15. Specifically, as noted above, if the transmitting device comprises the base station (e.g., base station 120), the base station may configure the IRS (e.g., IRS 425) to reflect a wireless reference signal transmitted from the base station back to the base station as illustrated in FIG. 5. Alternatively, if the transmitting device comprises a UE (e.g., UE 105), the UE may configure the IRS (e.g., IRS 425) to reflect a wireless reference signal transmitted from the UE back to the UE as illustrated in FIG. 8. For example, the transmitting device (e.g., base station 120 and/or UE 105) may communicate with a controller (not shown) of IRS 425 to control through a control channel. The controller may configure a software-controlled reflection/scattering profile to reflect the wireless reference signal back to UE 105 in real time.

Subsequently, at block 1230, the functionality comprises transmitting a RF signal, by the transmitting device, to the IRS (e.g., IRS 425). Means for performing functionality at block 1230 may comprise processor 1410, wireless communications interface 1430, and/or other components of a base station (e.g., base station 120), as illustrated in FIG. 14. Means for performing functionality at block 1210 may also comprise processor 1510, wireless communications interface 1530 and/or other components of a UE (e.g., UE 105), as illustrated in FIG. 15. Specifically, as noted above, if the transmitting device comprises the base station (e.g., base station 120), the base station may transmit a RF signal (e.g., a wireless reference signal 560) to the IRS (e.g., IRS 425) as illustrated in FIG. 5. Alternatively, if the transmitting device comprises a UE (e.g., UE 105), the UE may transmit a RF signal (e.g., a wireless reference signal 860) to the IRS (e.g., IRS 425) as illustrated in FIG. 8.

At block 1240, the functionality comprises receiving by the transmitting device, a wireless reflected signal reflected from the IRS. Means for performing functionality at block 1240 may comprise wireless communications interface 1430 and/or other components of a base station (e.g., base station 120), as illustrated in FIG. 14. Means for performing functionality at block 1210 may also comprise wireless communications interface 1530 and/or other components of a UE (e.g., UE 105), as illustrated in FIG. 15. Specifically, as noted above, if the transmitting device comprises the base station (e.g., base station 120), the base station may receive a wireless reflected signal (e.g., wireless reflected signal 565) including the reflection (e.g., a 180-degree reflection reflected by IRS 425) of the transmitted RF signal (e.g., wireless reference signal 560) as illustrated in FIG. 5. Alternatively, if the transmitting device comprises a UE (e.g., UE 105), the UE may receive a wireless reflected signal (e.g., wireless reflected signal 865) including the reflection (e.g., a 180-degree reflection reflected by IRS 425) of the transmitted RF signal (e.g., wireless reference signal 860) as illustrated in FIG. 8.

At block 1250, the functionality comprises determining by the transmitting device, measurements based at least in part on the received wireless reflected signal, and at block 1260, the functionality comprises transmitting the determined measurements, by the transmitting device, to the location server. Means for performing functionality at blocks 1250 and 1260 may comprise processor 1410, wireless communications interface 1430, and/or other components of a base station (e.g., base station 120), as illustrated in FIG. 14. Means for performing functionality at block 1210 may also comprise processor 1510, wireless communications interface 1530 and/or other components of a UE (e.g., UE 105), as illustrated in FIG. 15. Specifically, as noted above, if the transmitting device comprises the base station (e.g., base station 120), blocks 1250 and 1260, the base station may determine measurements such as RTT, AoD, AoA, etc., based on the wireless reflected signal (e.g., wireless reflected signal 565) and may transmit the determined measurement to the location server 160 for determining the location of the IRS as illustrated in FIG. 5. Alternatively, if the transmitting device comprises a UE (e.g., UE 105), the UE may determine measurements such as RTT, AoD, AoA, etc., based on the wireless reflected signal (e.g., wireless reflected signal 865) and may transmit the determined measurement to the location server 160 for determining the location of the IRS as illustrated in FIG. 8.

At block 1265, the functionality comprises determining, by the location server, the location of the IRS based on the measurements. Specifically, as disclosed above, the location server (e.g., location server 160) may determine the location of the IRS according to the configuration disclosed along with the description of FIG. 7.

Figure 13:
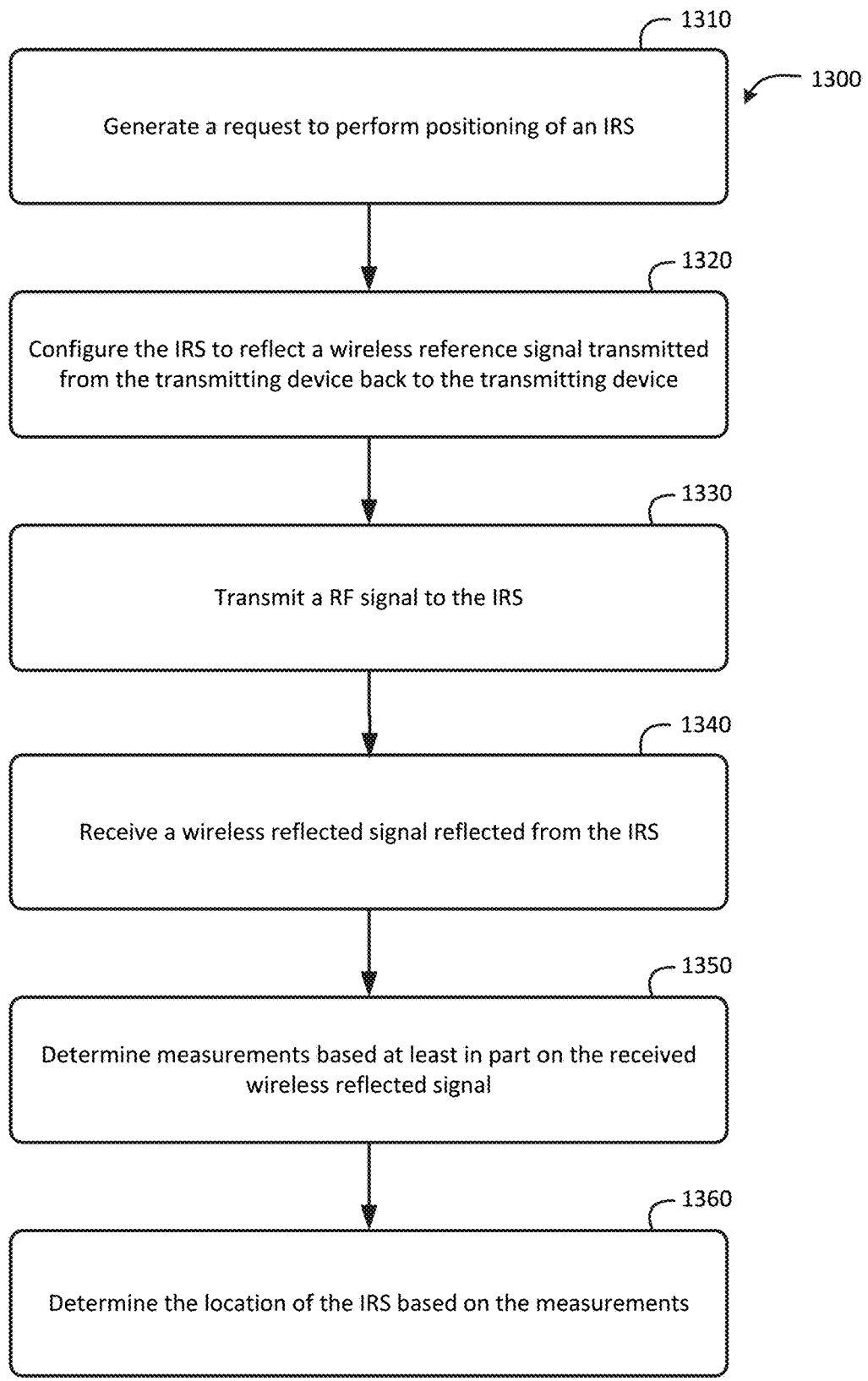

FIG. 13 is a flow diagram of a method 1300 of IRS positioning performed by a UE in a wireless communication network, according to an embodiment. Means for performing the functionality illustrated in one or more of the blocks shown in FIG. 13 may be performed by hardware and/or software components of a UE (e.g., UE 105 in FIGS. 1-6, and 8). Example components of the UE is illustrated in FIG. 15, which is described in more detail below.

At block 1310, the functionality comprises generating a request by UE (e.g., UE 105) to perform positioning of an IRS (e.g., IRS 425). Means for performing functionality at block 1310 may comprise a processor 1510 and/or other components of a UE (e.g., UE 105), as illustrated in FIG. 15. Specifically, as noted above, the UE may generate a positioning request. This position request may come, for example, from an application (or app) executed by UE 105. This may be a result from user interaction with UE 105, based on a determined schedule, or based on other triggers (including user input).

At block 1320, the functionality comprises configuring the IRS to reflect a wireless reference signal transmitted from the UE back to the UE. Means for performing functionality at block 1330 may comprise wireless communications interface 1530 and/or other components of a UE (e.g., UE 105), as illustrated in FIG. 15. Specifically, as noted above, the UE may configure the IRS (e.g., IRS 425) to reflect a wireless reference signal transmitted from the UE back to the UE as illustrated in FIG. 10. For example, UE 105 may communicate with a controller (not shown) of IRS 425 to control through a control channel. The controller may configure a software-controlled reflection/scattering profile to reflect the wireless reference signal back to UE 105 in real time.

At block 1330, the functionality comprises transmitting a RF signal to the IRS. Means for performing functionality at block 1330 may comprise processor 1510 and/or other components of a UE (e.g., UE 105), as illustrated in FIG. 15.

Specifically, as noted above, the UE (e.g., UE 105) may transmit a RF signal (e.g., a wireless reference signal 1060) to IRS 425 subsequent to configuring IRS 425 to reflect the wireless reference signal transmitted from UE 105 back to UE 105 as illustrated in FIG. 10.

At block 1340, the functionality comprises receiving a wireless reflected signal reflected from the IRS. Means for performing functionality at block 1330 may comprise wireless communications interface 1530 and/or other components of a UE (e.g., UE 105), as illustrated in FIG. 15. Specifically, as noted above, the UE (e.g., UE 105) may receive a wireless reflected signal (e.g., wireless reflected signal 1065) including the reflection (e.g., a 180-degree reflection reflected by IRS 425) of the wireless reference signal (e.g., wireless reference signal 1060).

At block 1350, the functionality comprises determining measurements based at least in part on the received wireless reflected signal. Means for performing functionality at block 1350 may comprise processor 1510 and/or other components of a UE (e.g., UE 105), as illustrated in FIG. 15. Specifically, as noted above, the UE may determine measurements such as RTT, AoD, AoA, etc., based on the wireless reflected signal (e.g., wireless reflected signal 1065) as illustrated in FIG. 10.

At block 1360, the functionality comprises determining the location of the IRS based on the measurements. Means for performing functionality at block 1360 may comprise processor 1510 and/or other components of a UE (e.g., UE 105), as illustrated in FIG. 15. Specifically, as disclosed above, the UE may determine the location of the IRS according to the configuration disclosed along with the description of FIG. 7.

FIG. 14 is a block diagram of an embodiment of a base station 120, which can be utilized as described herein above (e.g., in association with base station 120 in FIGS. 1, 4, 5, and 6, gNB 210 and/or the ng-eNB 214 in FIG. 2, and/or TRPs 320 in FIG. 3). It should be noted that FIG. 14 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1405 (or may otherwise be in communication, as appropriate). The hardware elements may include a processor(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1430 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

The base station 120 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein.

In many embodiments, the base station 120 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the base station 120 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the base station 120 (and/or processor(s) 1410 or DSP 1420 within base station 120). In some embodiments, then, such code and/or instructions can be used to configure and/or adapt a general-purpose computer (or other device) to perform one or more operations in accordance with the described methods.

FIG. 15 is a block diagram of an embodiment of a UE 105, which can be utilized as described herein above (e.g., in association with e.g., UEs 145 in FIG. 1, and UE 105 in FIGS. 2, 3, 4, 8, and 10). For example, UE 105 can perform one or more of the functions of the method shown in FIG. 9. It should be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 15.

UE 105 is shown comprising hardware elements that can be electrically coupled via a bus 1505 (or may otherwise be in communication, as appropriate). The hardware elements may include a processor(s) 1510 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1510 may comprise one or more processing units, which may be housed in a single integrated circuit (IC) or multiple ICs. As shown in FIG. 15, some embodiments may have a separate DSP 1520, depending on desired functionality. Location determination and/or other determinations based on wireless communication may be provided in the processor(s) 1510 and/or wireless communication interface 1530 (discussed below). UE 105 also can include one or more input devices 1570, which can include without limitation one or more keyboards, touch screens, touch pads, microphones, buttons, dials, switches, and/or the like; and one or more output devices 1515, which can include without limitation one or more displays (e.g., touch screens), light emitting diodes (LEDs), speakers, and/or the like.

UE 105 may also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable UE 105 to communicate with other devices as described in the embodiments above. The wireless communication interface 1530 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1532 that send and/or receive wireless signals 1534. According to some embodiments, the wireless communication antenna(s) 1532 may comprise a plurality of discrete antennas, antenna arrays, or any combination thereof. The antenna(s) 1532 may be capable of transmitting and receiving wireless signals using beams (e.g., Tx beams and Rx beams). Beam formation may be performed using digital and/or analog beam formation techniques, with respective digital and/or analog circuitry. The wireless communication interface 1530 may include such circuitry.

Depending on desired functionality, the wireless communication interface 1530 may comprise a separate receiver and transmitter, or any combination of transceivers, transmitters, and/or receivers to communicate with base stations (e.g., ng-eNBs and gNBs) and other terrestrial transceivers, such as wireless devices and access points. UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

UE 105 can further include sensor(s) 1540. Sensor(s) 1540 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of UE 105 may also include a Global Navigation Satellite System (GNSS) receiver 1580 capable of receiving signals 1584 from one or more GNSS satellites using an antenna 1582 (which could be the same as antenna 1532). Positioning based on GNSS signal measurement can be utilized to complement and/or incorporate the techniques described herein. The GNSS receiver 1580 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1580 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1580 is illustrated in FIG. 15 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1510, DSP 1520, and/or a processor within the wireless communication interface 1530 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1510 or DSP 1520.

The UE 105 may further include and/or be in communication with a memory 1560. The memory 1560 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1560 of UE 105 also can comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1560 that are executable by UE 105 (and/or processor(s) 1510 or DSP 1520 within UE 105). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of positioning an intelligent reflecting surface (IRS) using a transmitting device in a wireless communications network. The method comprises configuring the IRS to reflect a wireless reference signal back to the transmitting device and subsequent to configuring the IRS, transmitting the wireless reference signal from the transmitting device to the IRS. The method also comprises receiving a wireless reflected signal at the transmitting device, wherein the wireless reflected signal comprises a reflection of the wireless reference signal, reflected by the IRS and determining measurements configured for positioning the IRS based at least in part on the wireless reflected signal, wherein a location of the IRS is determined based on the measurements.

Clause 2. The method of clause 1, wherein the measurements comprise round trip signal propagation delay (RTT) and at least one of angle-of-departure (AoD) of the wireless reference signal or angle-of-arrival (AoA) of the wireless reflected signal.

Clause 3. The method of clause 1, wherein the method further comprises: receiving from a location server, a request configuring the transmitting device to transmit the reference signal to the IRS; and transmitting the determined measurements to the location server for the determination of the location of the IRS based on the measurements.

Clause 4. The method of clause 3, wherein the transmitting device comprises a base station, and wherein the request is received via a New Radio (NR) Positioning Protocol annex (NRPPa) Protocol.

Clause 5. The method of clause 3, wherein the transmitting device comprises a user equipment with a known location, and wherein the request is received via Long-Term Evolution (LTE) Positioning Protocol (LPP).

Clause 6. The method of clause 1, wherein the location of the IRS is determined by the transmitting device.

Clause 7. A method of positioning an intelligent reflecting surface (IRS) using a location server in a wireless communications network, the method comprising: transmitting to a transmitting device, a request configuring the transmitting device to transmit a wireless reference signal to the IRS; receiving from the transmitting device, measurements determined based on a wireless reflected signal, wherein the wireless reflected signal comprises a reflection of the wireless reference signal, reflected by the IRS; and determining a location of the IRS based on the measurements.

Clause 8. The method of clause 7, wherein the measurements comprise Time difference of arrival (TDOA) and angle-of-departure (AOD) of the wireless reference signal.

Clause 9. The method of clause 7, wherein the transmitting device comprises a base station and the request is transmitted via a New Radio (NR) Positioning Protocol annex (NRPPa) Protocol.

Clause 10. The method of clause 7, wherein the transmitting device comprises a user equipment and the request is transmitted via a Long-Term Evolution (LTE) Positioning Protocol (LPP).

Clause 11. A transmitting device in a wireless communication network, comprising: a wireless communication interface configured to: configure the IRS to reflect a wireless reference signal back to the transmitting device; subsequent to configuring the IRS, transmit the wireless reference signal to the IRS; and receive a wireless reflected signal, wherein the wireless reflected signal comprises a reflection of the wireless reference signal, reflected by the IRS; a memory; and one or more processing units communicatively coupled to the wireless communication interface and the memory, the one or more processing units configured to: determine measurements configured for positioning the IRS based at least in part on the wireless reflected signal, wherein a location of the IRS is determined based on the measurements.

Clause 12. The transmitting device of clause 11, wherein the measurements comprise round trip signal propagation delay (RTT) and at least one of angle-of-departure (AoD) of the wireless reference signal or angle-of-arrival (AoA) of the wireless reflected signal.

Clause 13. The transmitting device of clause 11, wherein the wireless communication interface is configured to: receive from a location server, a request configuring the transmitting device to transmit the reference signal to the IRS; and transmit the determined measurements to the location server for the determination of the location of the IRS based on the measurements.

Clause 14. The transmitting device of clause 13, wherein the transmitting device comprises a base station, and wherein the request is received via a New Radio (NR) Positioning Protocol annex (NRPPa) Protocol.

Clause 15. The transmitting device of clause 13, wherein the transmitting device comprises a user equipment with a known location, and wherein the request is received via Long-Term Evolution (LTE) Positioning Protocol (LPP).

Clause 16. The transmitting device of clause 11, wherein the wireless communication interface is further configured to: determine the location of the IRS based on measurements.

Clause 17. A location server comprising: a transceiver configured to: transmit to a transmitting device, a request configuring the transmitting device to transmit a wireless reference signal to the IRS; and receive from the transmitting device, measurements determined based on a wireless reflected signal, wherein the wireless reflected signal comprises a reflection of the wireless reference signal, reflected by the IRS; a memory; and one or more processing units communicatively coupled with the transceiver and the memory, the one or more processing units configured to: determine a location of the IRS based on the measurements.

Clause 18. The device of clause 17, wherein the measurements comprise Time difference of arrival (TDOA) and angle-of-departure (AOD) of the wireless reference signal.

Clause 19. The device of clause 17, wherein the transmitting device comprises a base station and the request is transmitted via a New Radio (NR) Positioning Protocol annex (NRPPa) Protocol.

Clause 20. The device of clause 17, wherein the transmitting device comprises a user equipment and the request is transmitted via a Long-Term Evolution (LTE) Positioning Protocol (LPP).

What is claimed is:

1. A method comprising:
configuring an intelligent reflecting surface (IRS) to reflect a wireless reference signal received from a transmitting device back to the transmitting device;
transmitting the wireless reference signal from the transmitting device to the IRS;
receiving a reflected wireless reference signal at the transmitting device, the reflected wireless reference signal comprising a reflection of the wireless reference signal, reflected by the IRS;
making one or more measurements of the reflected wireless reference signal, wherein the measurements comprise round trip signal propagation delay (RTT) and at least one of angle-of-departure (AoD) of the wireless reference signal or angle-of-arrival (AoA) of the reflected wireless reference signal; and
determining a location of the IRS based at least in part on measurements of the reflected wireless reference signal.

2. The method of claim 1, wherein the method further comprises:
receiving from a location server, a request configuring the transmitting device to transmit the wireless reference signal to the IRS; and
transmitting the measurements to the location server for the determination of the location of the IRS based on the measurements.

3. The method of claim 2, wherein the transmitting device comprises a base station, and wherein the request is received via a New Radio (NR) Positioning Protocol annex (NRPPa) Protocol.

4. The method of claim 2, wherein the transmitting device comprises a second user equipment (UE2) with a known location, and wherein the request is received via Long-Term Evolution (LTE) Positioning Protocol (LPP).

5. The method of claim 1, further comprising determining a location of a first user equipment (UE1) communicatively coupled with the IRS using the determined location of the IRS.

6. A method comprising:
transmitting to a transmitting device, a request configuring the transmitting device to transmit a wireless reference signal to an intelligent reflecting surface (IRS);
receiving from the transmitting device, measurements of a reflected wireless reference signal, the reflected wireless reference signal comprising a reflection of the wireless reference signal, reflected by the IRS;
making one or more measurements of the reflected wireless reference signal, wherein the measurements comprise round trip signal propagation delay (RTT) and at least one of angle-of-departure (AoD) of the wireless reference signal or angle-of-arrival (AoA) of the reflected wireless reference signal; and
determining a location of the IRS based on the measurements.

7. The method of claim 6, wherein the measurements comprise Time difference of arrival (TDOA) and angle-of-departure (AOD) of the reflected wireless reference signal.

8. The method of claim 6, wherein the transmitting device comprises a base station and the request is transmitted via a New Radio (NR) Positioning Protocol annex (NRPPa) Protocol.

9. The method of claim 6, further comprising determining a location of a first user equipment (UE1) communicatively coupled with the IRS using the determined location of the IRS; wherein the transmitting device comprises a second user equipment (UE2).

10. A transmitting device in a wireless communication network, comprising:
a wireless communication interface configured to:
configure an intelligent reflecting surface (IRS) to reflect a wireless reference signal back to the transmitting device;
transmit the wireless reference signal to the IRS; and
receive a reflected wireless reference signal, the reflected wireless reference signal comprising a reflection of the wireless reference signal, reflected by the IRS;
a memory; and
one or more processing units communicatively coupled to the wireless communication interface and the memory, the one or more processing units configured to:
make one or more measurements of the reflected wireless reference signal, wherein the measurements comprise round trip signal propagation delay (RTT) and at least one of angle-of-departure (AoD) of the wireless reference signal or angle-of-arrival (AoA) of the reflected wireless reference signal; and
determine a location of the IRS based at least in part on measurements of the reflected wireless reference signal.

11. The transmitting device of claim 10, wherein the wireless communication interface is configured to:
receive from a location server, a request configuring the transmitting device to transmit the wireless reference signal to the IRS; and
transmit the measurements to the location server for the determination of the location of the IRS based on the measurements.

12. The transmitting device of claim 11, wherein the transmitting device comprises a base station, and wherein the request is received via a New Radio (NR) Positioning Protocol annex (NRPPa) Protocol.

13. The transmitting device of claim 11, wherein the transmitting device comprises a second user equipment (UE2) with a known location, and wherein the request is received via Long-Term Evolution (LTE) Positioning Protocol (LPP).

14. The transmitting device of claim 10, wherein the one or more processing units are further configured to determine a location of a first user equipment (UE1) communicatively coupled with the IRS using the determined location of the IRS.

15. A location server comprising:
a transceiver configured to:
transmit to a transmitting device, a request configuring the transmitting device to transmit a wireless reference signal to an intelligent reflecting surface (IRS); and
receive from the transmitting device, measurements of a reflected wireless reference signal, the reflected wireless reference signal comprising a reflection of the wireless reference signal, reflected by the IRS;
a memory; and
one or more processing units communicatively coupled with the transceiver and the memory, the one or more processing units configured to:
make one or more measurements of the reflected wireless reference signal, wherein the measurements comprise round trip signal propagation delay (RTT) and at least one of angle-of-departure (AoD) of the wireless reference signal or angle-of-arrival (AoA) of the reflected wireless reference signal; and
determine a location of the IRS based on the measurements.

16. The location server of claim 15, wherein the measurements comprise Time difference of arrival (TDOA).

17. The location server of claim 15, wherein the transmitting device comprises a base station and the request is transmitted via a New Radio (NR) Positioning Protocol annex (NRPPa) Protocol.

18. The location server of claim 15, wherein:
the one or more processing units are configured to determine a location of a first user equipment (UE1) communicatively coupled with the IRS using the determined location of the IRS; and
the transmitting device comprises a second user equipment (UE2).

* * * * *